United States Patent
Mitra et al.

(10) Patent No.: US 7,822,897 B2
(45) Date of Patent: Oct. 26, 2010

(54) SYSTEM AND METHODS FOR CONNECTING MULTIPLE FUNCTIONAL COMPONENTS

(76) Inventors: Hirak Mitra, 1159 Sonora Ct., #111, Sunnyvale, CA (US) 94086; Raj Kulkarni, 1159 Sonora Ct., #111, Sunnyvale, CA (US) 94086; Richard Wicks, 1159 Sonora Ct., #111, Sunnyvale, CA (US) 94086; Michael Moon, 1159 Sonora Ct., #111, Sunnyvale, CA (US) 94086

( * ) Notice: Subject to any disclaimer, the term of this patent is extended or adjusted under 35 U.S.C. 154(b) by 81 days.

(21) Appl. No.: 12/164,083

(22) Filed: Jun. 29, 2008

(65) Prior Publication Data

US 2009/0083460 A1   Mar. 26, 2009

Related U.S. Application Data

(60) Provisional application No. 60/974,451, filed on Sep. 22, 2007.

(51) Int. Cl.
  *G06F 13/00* (2006.01)
(52) U.S. Cl. .................................. 710/104; 710/306
(58) Field of Classification Search ............. 710/36–42, 710/104–110, 305–317
See application file for complete search history.

(56) References Cited

U.S. PATENT DOCUMENTS

| | | | |
|---|---|---|---|
| 5,036,473 A | 7/1991 | Butts et al. | |
| 5,197,140 A | 3/1993 | Balmer | |
| 5,355,508 A | 10/1994 | Kan | |
| 5,471,592 A | 11/1995 | Gove et al. | |
| 5,481,679 A * | 1/1996 | Higaki et al. | ............... 710/316 |
| 5,522,083 A | 5/1996 | Gove et al. | |
| 5,594,918 A | 1/1997 | Knowles et al. | |
| 5,664,214 A | 9/1997 | Taylor et al. | |
| 5,892,962 A | 4/1999 | Cloutier | |
| 5,931,959 A | 8/1999 | Kwiat | |
| 6,061,754 A * | 5/2000 | Cepulis et al. | ............... 710/312 |
| 6,094,726 A | 7/2000 | Gonion et al. | |
| 6,789,150 B1 * | 9/2004 | Jain | ............... 710/305 |
| 6,871,253 B2 * | 3/2005 | Greeff et al. | ............... 710/316 |
| 7,007,128 B2 * | 2/2006 | Arimilli et al. | ............... 710/316 |
| 7,096,288 B2 | 8/2006 | Liao et al. | |
| 7,225,319 B2 | 5/2007 | Campi et al. | |
| 7,478,183 B2 * | 1/2009 | Pathak et al. | ............... 710/116 |
| 2006/0263933 A1 | 11/2006 | McGrath et al. | |
| 2008/0059687 A1 * | 3/2008 | Mayer et al. | ............... 710/317 |

* cited by examiner

*Primary Examiner*—Raymond N Phan
(74) *Attorney, Agent, or Firm*—Tue Nguyen

(57) ABSTRACT

The present invention relates to a flexible and reconfigurable bus fabric for microelectronic processing units, which can offer efficient memory data management, together with efficient data transfer and relieving data transfer congestion in an integrated circuit. In an embodiment, the present reconfigurable bus fabric comprises a multistate intersection between two data buses. Preferably, the multistate intersection comprises at least two states, a connecting state connecting the two data buses, and a disconnecting state disconnecting the two data buses. The multistate intersection provides a reconfigurable bus fabric, allowing different connection configuration for the data buses. This reconfigurable bus fabric offers soft-configurability and soft-reconfigurability, using software programming to arrange the circuits' interconnections. Other configurations are also disclosed in exemplary embodiments.

26 Claims, 25 Drawing Sheets

SYSTEM AND METHODS FOR CONNECTING MULTIPLE FUNCTIONAL COMPONENTS

This application is related and co-pending to U.S. patent application Ser. Nos. 12/164,080, 12/164,086 and 12/164,089 entitled "Soft-reconfigurable massively parallel architecture and programming system".

FIELD OF THE INVENTION

The present invention relates to apparatuses and methods to integrated circuits, and more particularly to hardware and software system design and parallel processing architecture and programming system.

BACKGROUND OF THE INVENTION

Everywhere in communication systems, increasingly sophisticated algorithms are being used to support higher data rates and richer services. This is true in all application areas, but perhaps most visibly in mobile and video segments, where the move to new generation is driving significant changes in component design for telecoms equipment and Multimedia Video equipment, such as multi stream/channel based real-time video surveillance equipment where intelligent inline/in-situ decisions have to be made. In addition to basic voice and messaging, UMTS paves the way for telecom operators and now WIMAX based open systems, and possibly open spectrum such as 700 MHz in US will offer sophisticated data oriented services that industry analysts predict are essential for revenue growth over the next decade.

As people strive for higher data rates or longer reach over fixed channels, data rates get ever-closer to Shannon's limit and more sophisticated algorithms are required. Indeed, the requirement for signal processing is rising ten to a hundred times faster than Moore's law can deliver.

Estimation and detection algorithms in today's communication systems require the number of operations per second to grow by a factor of ten every four years; that compares to the increase in processor speed from Moore's law of a factor of ten every six years. Worse, while Moore's law holds well for general purpose processors and memory, the difficulty of integrating ever bigger systems means that the growth curve for complex System-on-a-chip ("SoC")-ASICs is significantly slower—"the design gap"—with a CAGR of 22%.

Not only must equipment deliver improved performance, design times are under pressure and budgets are stressed, often in an environment where standards are shifting. Example WiMax started out in 2001 (IEEE 802.16d) with stationary network based wireless vision, in 2006 transformed into mobile (IEEE 802.16e) and now wanting to transform further by supporting wide spectrum in FDD & TDD domain to provide further spectrally efficient transmission of Data, Video, and Voice (802.16m).

A fundamental change approach is required, and a growing awareness of the attractiveness of reconfigurable DSP, flexible architectures or other (SDR) systems. Makimoto's wave would suggest such a transition is overdue with the most desirable characteristics of these techniques including "efficient", "optimal" or "cost effective".

SUMMARY

In an embodiment, the present invention discloses a flexible and reconfigurable bus fabric for microelectronic processing units. The present bus fabric offers efficient memory data management, together with efficient data transfer and relieving data transfer congestion in an integrated circuit. In an embodiment, the present reconfigurable bus fabric comprises a multistate intersection between two data buses. Preferably, the multistate intersection comprises at least two states, a connecting state connecting the two data buses, and a disconnecting state disconnecting the two data buses. The multistate intersection provides a reconfigurable bus fabric, allowing different connection configuration for the data buses. This reconfigurable bus fabric offers soft-configurability and soft-reconfigurability, using software programming to arrange the circuits' interconnections.

The multistate interconnection can comprise logic device, switching device or MEMS device. Also the bus fabric can further comprise a controller to control the states of the multistate intersections.

In an embodiment, the reconfigurable bus fabric comprises a plurality of data buses having multistate intersections. Preferably, a first plurality of data buses runs in one direction, intersecting with a second plurality of data buses, running in a different direction. The intersections between the first and second data buses are preferably multistate intersections, with some optional hardwire interconnections or hardwire disconnections. The bus fabric further comprises a controller to control the multistate intersections.

With the multistate intersections connecting the first and second data buses, the data buses can act as a switching matrix, with a controller controlling which data bus connecting or disconnecting to which data bus.

The present bus fabric can be configured to provide connection to functional components, which typically comprise a group of devices for performing a set of logical processing, such as logic design module, a coprocessor, an ALU, a logic design having a plurality of RTL code lines, or an IP block. The integrated circuit can include memory devices to accommodate data passing between the functional components. The functional components can read and write data to memory devices, and the memory data can pass from one location to another location so that the functional components can access it. In a preferred embodiment, to minimize data transfer, the memory can be arranged so that a functional component can write to a memory block that will be accessed by the next functional component. Thus when processing passes to the next functional component, the input data is readily available without any data transfer.

In an embodiment, the functional components and memory devices have data buses crossing with connection data buses with multistate intersections, which are preferably controlled by a controller. The controller forms connection for the functional components with appropriate memory, for example. Thus when a functional component is ready for processing, its input data memory and its output data memory are connected to the functional component via the multistate intersections, controlled by the controller. Using this arrangement, data transfer can be minimized, thus relieving data congestion in an integrated circuit.

In an embodiment, there is a plurality of functional components in a chain of processing, together with a plurality of memory devices to provide input and output data. The chain of functional components and memory devices can form a slice, and the connections between this slice can be provided by a set of local connection data buses, controlled by a controller. A set of global connection data buses can provide connections between the slices, for example, to provide the connections between a functional component of a slice to a memory in another slice. The data path would be from the functional component to the first local connection data bus, then going to the global connection data bus, and finally to the local connection data bus of the memory device.

The controller can comprise a multiplexer or a switching matrix. The controller can also perform any connections between the functional components and the memory devices, thus can accommodate any chaining configuration of the functional components.

In an embodiment, the functional components can be chained together, preferably by software so that at least one functional component starts after the completion of at least another functional component. For example, the functional component can comprise two control components: a GO component to start the devices, a DONE component to identify the completion, and an optional GO_OFF component to indicate that the device is busy processing. In an embodiment, the control components (GO, DONE, or GO_OFF) are register for storing the state of the control components.

DETAILED DESCRIPTION OF THE PREFERRED EMBODIMENTS

Figure 1:
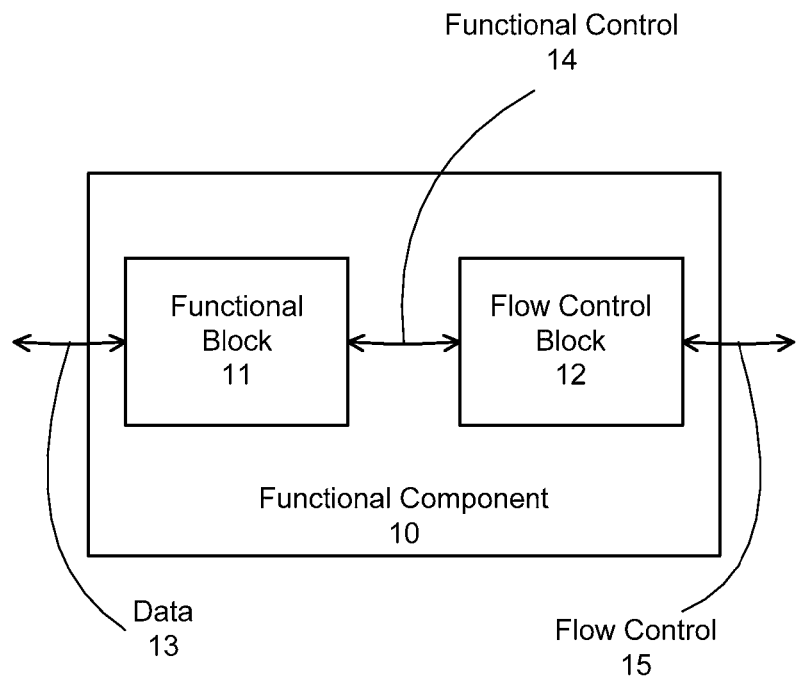
FIG. 1 illustrates a block diagram of an exemplary functional component.

| Acronyms: | |
|---|---|
| ASIC | Application Specific Integrated Circuit |
| CAGR | Compound Annual Growth Rate |
| CCB | Component Control Block |
| CPU | Central Processing Unit |
| DDI | Digital Design Implementation |
| DSP | Digital Signal Processing |
| FB | Functional Block |

-continued

| Acronyms: | |
|---|---|
| FC | Functional Component |
| FCB | Flow Control Block |
| FDD | Frequency Division Duplexing |
| FFT | Fast Fourier Transform Block |
| FIR | Finite Impulse Response Filter Block |
| FPGA | Field-Programmable Gate Array |
| IC | Integrated Circuit |
| IP | Intellectual Property embodied in a circuit |
| LCCB | Local Component Control Block |
| MIMD | Multiple-Instruction, Multiple Data |
| MISD | Multiple Instruction, Single Data |
| MMU | Memory Management Unit |
| OS | Operating System |
| RDL | Register Definition Language |
| SIMD | Single Instruction, Multiple Data |
| SoC | System on a Chip |
| SDR | Software Defined Radio |
| TDD | Time Division Duplexing |
| TDDM | Time Division Demultiplexer |
| TDM | Time Division Multiplexer |
| UMTS | Universal Mobile Telecommunications System |
| WIMAX | Worldwide Interoperability for Microwave Access |

In some embodiments, this patent discloses a flexible and reconfigurable architecture for processing units such as processors, microprocessors, controllers and embedded controllers to address the rapid development and shorter cycle of the products. This architecture offers soft-configurability and soft-reconfigurability to accommodate a variety of different product families, together with high performance in the form of massive parallelism and high flexibility where the processing units are soft-programmed to perform different tasks. The present architecture also addresses control congestion by delegating a large number of CPU decisions to its slaves, and addresses memory bus congestion with interspersed local memories. The present architecture relieves the dependency on the CPU for faster execution, providing a new framework for a massively parallel computational system to improve efficiency and performance. In the system, most tasks are to be processed on the independent multiple slice subsystems so that the dependency on CPU decreases significantly.

The present device architecture provides real time signal processing capability with internal reconfigurability suitable for handling high bandwidth digital signal formats such as compressed video, audio, compact disk, digital versatile disc and mixed mode. The architecture of the present system provides DSP inherent high computational processing capability for dynamic video signals with high overall system bandwidth. The system also addresses data processing applications requiring a large number of operations, such as digital signal processing, image processing, pattern recognition, and neural network algorithms.

In some embodiments the present invention comprises a powerful and flexible massively parallel system architecture, a software infrastructure, and the complementing programming and software model. The architecture pertains to IC design, such as using configurable building block functions to accomplish custom functions. In some embodiments specific designs and applications disclosed in this application are implemented on FPGA, especially for DSP (digital signal processing) and image processing. But the present invention has application in many environments such as DSP (digital signal processing), image processing, and other multimedia applications, such as audio and image compression and decompression, code encryption and voice/image recognition, and telecommunications.

The present system provides a flexible computer architecture that in different embodiments is programmed in a wide variety of ways to perform a wide variety of applications. The present system is especially suited to be programmed to function as a parallel processor. The slices are programmed to function as a matrix of processing functional blocks, performing the same operations on different data in parallel. This case allows the present system to operate as a SIMD processor. In some embodiments the slices correspond to different programs, operating as a MIMD or MISD processor. In other embodiments system also operate as a SISD serial processor.

In embodiments the system provides two components to accelerate system design—a highly flexible, reconfigurable architecture, and a design methodology that is compatible with this architecture and maximally utilizes it to achieve huge performance at an affordable price. The present system provides extreme configurability, in that in some embodiments different applications map onto a given design without changing it; low power consumption, in that power optimization abilities are incorporated into the architecture itself, and a methodology that a normal engineering team can pick up and use with minimal effort, for example, to the end-user engineer an implementations of the present architecture are C-language function calls to the peripherals.

The system provides a method for building an embedded system where the software configures how the IC components communicate with each other and with the software, enabling the overall system to perform many different tasks. In some preferred embodiments the IC components perform their individual tasks with little or no involvement by the software.

The present architecture provides reconfigurable mixed analog and digital signal building block functions to accomplish custom functions. This is useful since software is easier to develop, debug, and modify as compare to hardware system design, which is a difficult, time-consuming task with turn-around time and long product cycle. Embodiments of the architecture provide an embedded system with a high flexibility where the software reconfigures the IC components at any time. Thus the present system comprises a hardware implementation that is very flexible and is reused by an entire family of applications. For example, a single embodiment supports a family of DSP applications, while another embodiment supports most image-processing applications.

1. Architecture to Address Control Congestion

In some embodiments a building block for the system is a functional component (FC), comprising a functional block (FB) and a flow control block (FCB). The FB is a group of devices for performing a set of logical processing, such as logic design module, a coprocessor, an ALU, or a logic design having a plurality of RTL code lines. The FCB comprises controllable start and stop functionality for the functional block.

As one example, the FBs contain phase locked loop (PLL) blocks, macro blocks, operational amplifiers, comparators, analog multiplexers, analog switches, voltage/current reference, switched capacitor filters, gm/C filters, data converters, communication blocks, clock generation blocks, customizable input/output blocks, fixed design input/output blocks, and processor blocks.

In some embodiments the FCB starts the FB when the FCB detects a start signal. When the FB completes operation it informs the FCB it has halted. Then the FB halts until the flow control block starts it again. In some embodiments FBs sit adjacent to local memories. Here the FB receives its input from some local memory, and writes its output to other local memory, based on the address where the data is stored. In some embodiments the FCB behaves like a software-controlled switch, to turn on and off the FB.

In some embodiments the FB can be an IP block. The FCB has a done flag, to signify that the functional block has completed its operation. The FCB has a next flag switch, to identify the next FB to activate.

FIG. 1 illustrates an exemplary functional component 10, comprising FB 11 in connection with a FCB 12 through a functional control data path 14. The FB 11 may communicate with other components or devices such as a memory block (not shown) through a data path 13, for example, to transfer data. The FCB 12 communicates with other devices or components through the flow control path 15, to receive external command or to send data.

Figure 2:
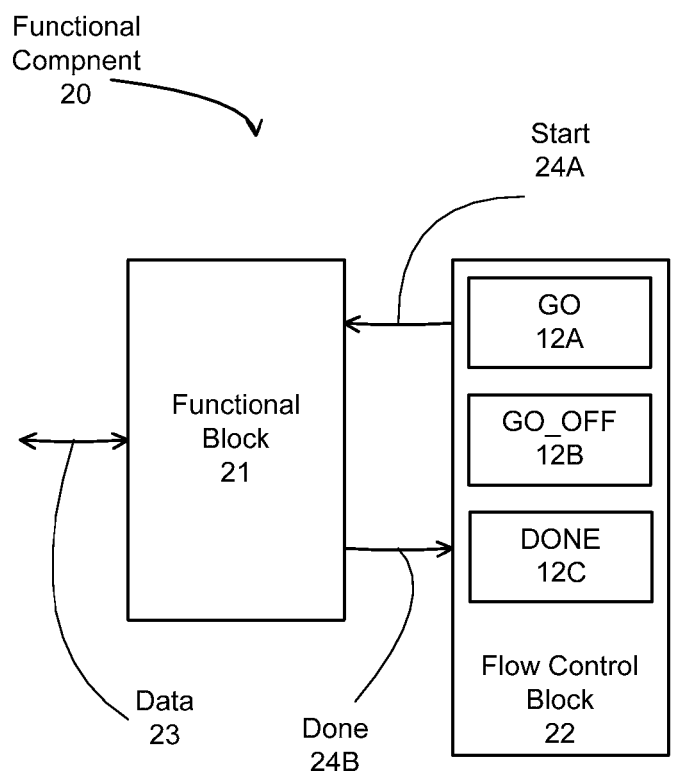
FIG. 2 illustrates a schematic of an exemplary functional component.

FIG. 2 shows a FB 20, comprising a FB 21 in connection with a FCB 22. Data is transferred from or to the FB 21 through the data path 23. The FCB 22 sends signal 24A to start the FB 21, and the FB 21 sends signal 24B to identify the completion of the processing. The FCB comprise a GO component 12A and a DONE component 12C. When the GO component 12A is set, e.g. having a value of 1, it starts the FB 21 by sending a start command through the signal path 24A. In some embodiments FCB 22 comprises a GO component 12A that starts FB 21 and thus starts processing when the GO component changes its value. In some embodiments the GO component is an address of a register (or memory) in a Component Control Block (CCB, not shown). When the GO CCB data changes, the FCB recognizes the change and starts processing.

In some embodiments, after the GO command starts its processing, the FB 21 resets the GO component 12A and stops monitoring the GO component 12A until after it finishes processing. In other embodiments the flow control block 22 comprises a GO_OFF component 12B that identifies that the FB is still processing and thus not available for taking a new command.

In some embodiments the GO_OFF component is be an address of a register (or memory) in a Component Control Block (CCB). When the FB 21 starts processing, it changes the GO_OFF CCB data to identify that the FB is busy processing and thus not available. If the GO component is set, it waits until the GO_OFF signal clears before the FB 21 can start processing again.

In some embodiments the FB 21 also resets the DONE component 12C to identify that it has started processing, and set the DONE component when it finishes processing. When the DONE component 12C is set, e.g. having a value of 1, this signifies that the functional component 21 has completed its processing. In some embodiments after complete processing, the FB sends a DONE signal through signal 24B to the FCB 22 to set the DONE component 12C. In some embodiments the DONE component 12C is a memory-mapped register (or memory) in a Component Control Block (CCB). When the DONE CCB data changes, other devices or blocks recognize that the functional block 21 has finished processing.

These particular embodiments are just exemplary embodiments, and skilled persons versed in the art will recognize that there are alternative ways to practice the FCB to control the FB.

In some embodiments the GO, GO_OFF and DONE components include more than one elements linked together in an AND or OR gates. For instance in some embodiments there are be 4 registers for each of the components. In some embodiments the four GO components are connected with an OR gate, in other words there are 4 ways to start the FB 21 by setting each of the GO components. In some embodiments the four GO components are connected with an AND gate, meaning all four GO components have to be set before the FB can start. Here the AND connection provide a synchronization feature, allowing the FB to wait for the four conditions to be satisfied before start processing. In other embodiments the various GO components are connected in various logical fashions, allowing for a variety of scenarios.

In some embodiments the DONE components are more than one registers each. The architecture uses the DONE components to signal the completion of the present FB, which then signals the start of another FB. In some embodiments multiple DONE components allow the chaining of multiple other FBs after the completion of the current one.

Further, in some embodiments the FBs are chained to each other, effectively creating a flow of operation linking multiple FBs. In some embodiments the connections are designed with software at design time, linking the function blocks to perform the desired functionality of the IC chip.

In some embodiments the connections are performed through software, reading through a memory-mapped register interface for connecting together the components of the IC. In such embodiments the software program further specifies how the components of the IC interrupt, and thus change the execution sequence of the software program. Also, the software program specifies how the components of the IC sequence themselves with data passing without any intervention.

Figure 3:
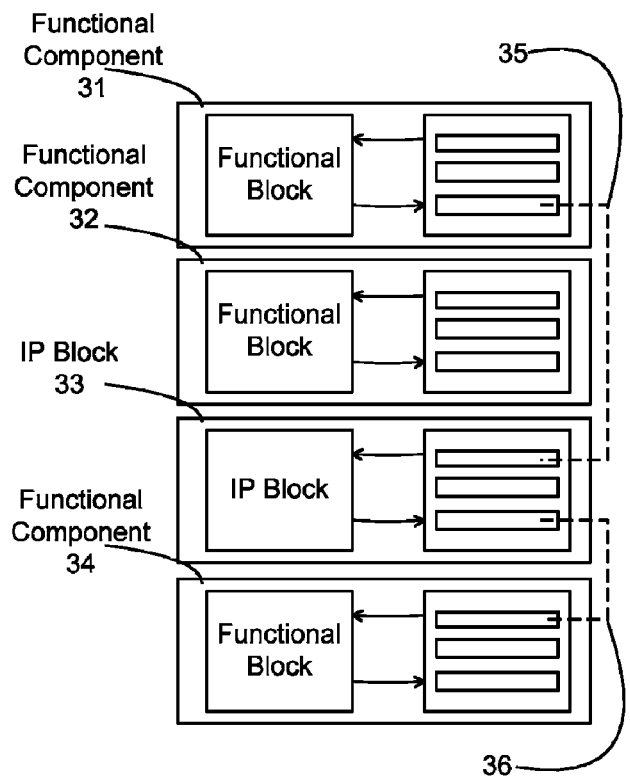
FIG. 3 illustrates an exemplary connection of functional components.

FIG. 3 illustrates an exemplary connection of four functional components 31-34, which comprises an FB or IP block. The DONE component of FBs 31 and 33 is chained to the GO component of FCs 33 and 34 through the link 35 and 36 respectively. With this exemplary chain, the completion of FB 31 triggers the start of FC 33, which in turn, after completion, triggers the start of function component 34. Thus in effect, the chaining allows the serial processing of FCs 31, 33 and 34.

Figure 4:
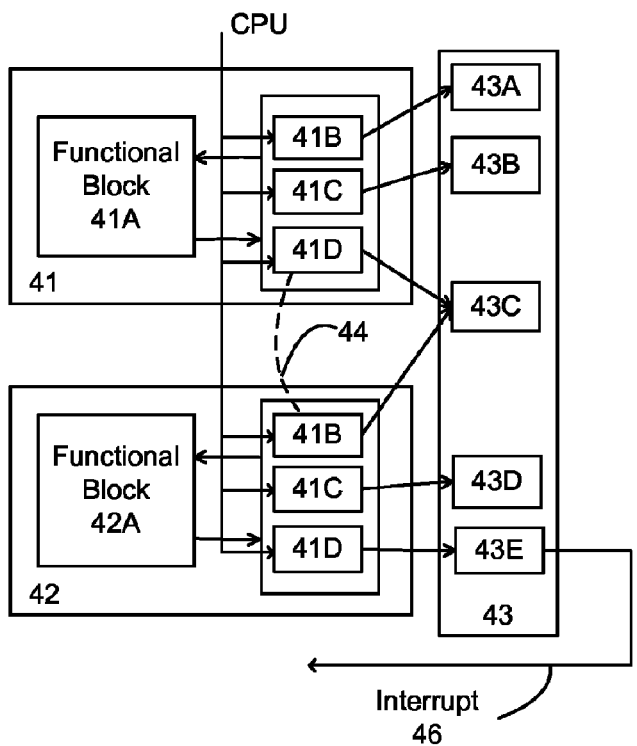
FIG. 4 illustrates an exemplary chaining methodology for connecting functional components.

FIG. 4 illustrates an exemplary chaining methodology, comprising two FBs 41 and 42, together with a CCB (component control block) 43. The FC 41/42 comprises a FB 41A/42A and a FCB with three registers of GO component 41B/42B, GO_OFF component 41C/42C and DONE component 41D/42D, respectively. The registers 41B-41D and 42B-42D contain the address for the CCB 43, with the corresponding value of 43A-43E.

In some embodiments the FCBs connected to a central processing unit (CPU) for configuring or reconfiguring the address stored in these registers 41B-41D and 42B-42D. These addresses correspond to the registers 43A-43E in the CCB 43. The linking of FC 41 and 42, symbolically illustrated as the linkage 44 between the DONE component 41D and the GO component 42B, is performed by assigning the DONE component 41D and the GO component 42B the same address of the CCB register 43C. In essence, FB 41A finishes processing, it sets the value of the DONE register 41D, which is stored in register 43C. Since this is precisely the value of the GO register 42B, FB 42A thus receives the start signal as soon as the FB 41A finishes. The two FBs 41 and 42 are then chained serially together.

In some embodiments the CPU sets the register 43A of the CCB to start the chain function of FUs 41 and 42. Also, the last DONE component 42D of FC 42 sets the register 43E, which is an interrupt 46 to the CPU. Thus the completion of the chain 41/42 raises an interrupt 43E, which alerts the CPU to take appropriate action.

In some embodiments the CCB is a table of $2^N$ bits, referred to by bit addresses CCB[$0:2^N-1$]. In some embodiments the CCB table is memory-mapped so the CPU is able to view it and to write it. In one aspect, CCB[0] is set to be zero and CCB[1] is 1. CCB[0] and CCB[1] can be hard-wired. A portion of the CCB table, CCB[2:$2^M$-1] with M<N, is reserved as interrupts to the CPU.

Figure 5:
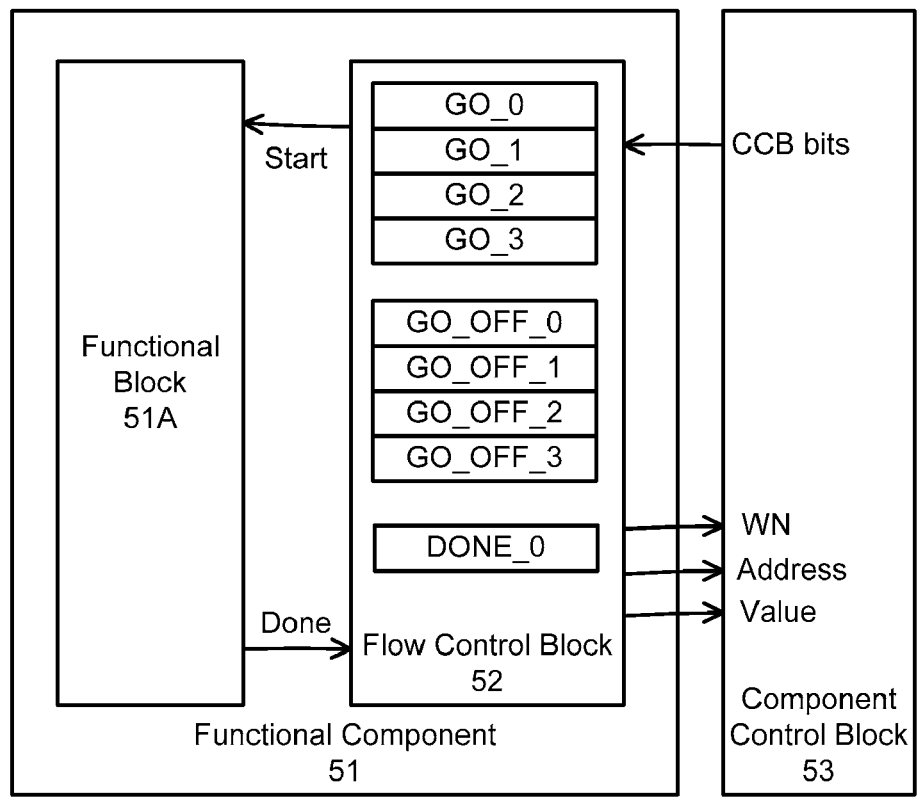
FIG. 5 shows a preferred embodiment of a Functional Component.

FIG. 5 shows an embodiment where the FC has two pieces, an FB, which can be any logic device or IP block, and an FCB. The blocks can have simple memory-mapped register set and also provides interrupts to the CPU. The FCB interacts with the CCB, in an embodiment such as this one through 12 N-bit addresses in the flow control block: $2^Q$ (4 shown) start addresses GO_ADDR_0, GO_ADDR_1, . . . , $2^R$ (4 shown) busy addresses GO_OF_ADDR_0, GO_OFF_ADDR_1, . . . , and a plurality (1 shown) of completion/chaining addresses DONE_ADDR_0, . . . .

In some aspects, in normal operation of the component, the FC starts the component when the start condition involving a logical function for the start addresses is satisfied. For example, CCB[GO_ADDR_0[N−1:0]]==1. At the time the machine starts, the FCB sets the busy signal in the CCB to indicate the status of the functional block. For example, CCB [GO_OFF_ADDR_0[N−1:0]]==0.

In such as embodiment at the time the machine completes, the FCB sets the completion signal in the CCB, to indicate the completion status and possibly to start the chaining process. For example, CCB[DONE_ADDR 0[N−1:0]]==1. This completion mechanism allows the CPU to chain together a series of predefined components in such a way that they run in series.

In embodiments such as the one described above, the FCB is interlinked with the CCB where the FCB carries the addresses and the CCB carries the value. In some aspects not all CCB bits connect to every FC. The connection is typically determined for a given implementation, where each CCB bits is connected to a particular FC. This prevents needless congestion for the CCB bits. In some embodiments the connection is software driven, meaning the registers of the flow control blocks are set by the CPU following the current program. This mechanism effectively performs the chaining of the various functional components, creating the necessary flow of functions residing in the FCs.

Figure 6:
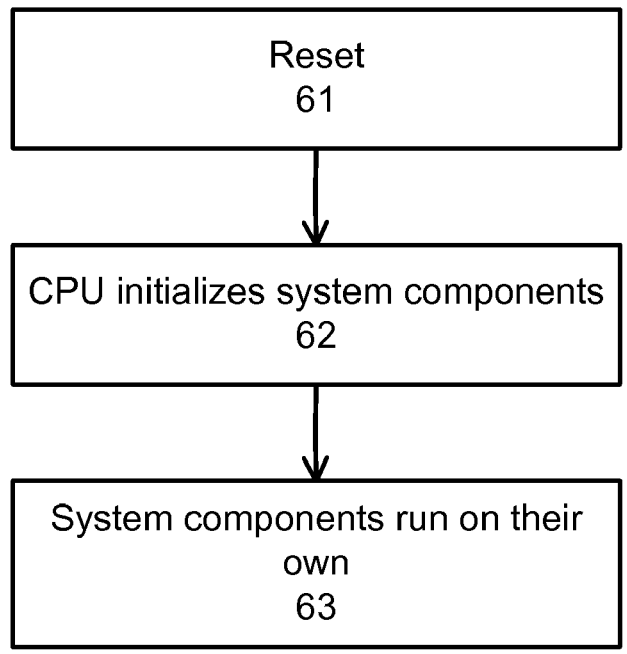
FIG. 6 illustrates an exemplary flowchart for system operation.

In some embodiments the system starts with the CPU initializes the connections (FIG. 6). This is possible since the flow control blocks are designed to be memory-mapped for the CPU to access. The initialization chains the FCs together in series, parallel, or in any other logical ways. The chaining is performed through the start addresses and the completion addresses. For example, FC A, at completion, starts another FC in series. In some embodiments Component A starts a plurality of other FCs in parallel. In some embodiments an FC starts after receiving the completion signal of another FC; in other embodiments it waits until receiving a plurality of completion signals, arranged in a predetermined logic. For example, FC C is chained from other FCs D and E through AND logic. This chaining determines that FC C only starts after both FCs D and E complete processing. If D completes processing before E, C is still waiting since the AND logic only permits C to start if both start signals are satisfied.

In some embodiments after initialization, the CPU starts the chain process by setting the start signal in the CCB; the CPU does this by writing the CCB's memory-mapped registers. After stating the chain process, the CPU leaves it all alone; conversely the device only interacts with the CPU through its interrupts. The interrupts signify that the chain process is completed and it is time for the CPU to start another chain process. This mechanism significantly reduces CPU congestion, since the demand on CPU time is now only a small fraction compared to the processing time.

Figure 7:
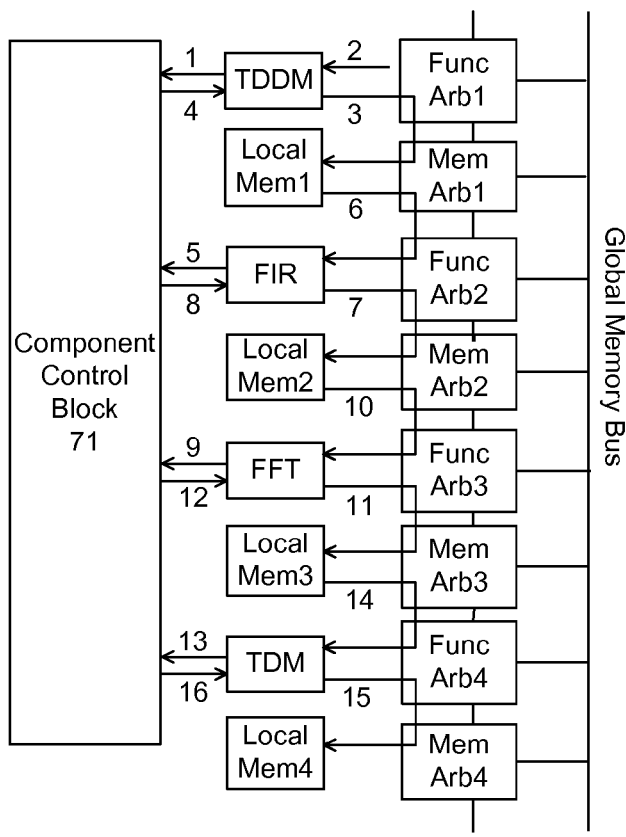
FIG. 7 shows an exemplary chain process for a plurality of functional components.

In some embodiments, as FIG. 7 illustrates, the chain process includes a TDDM (time division demultiplexer), a FIR, a FFT and a TDM FCs. The FCs are connected so that the TDDM block is chained to the FIR, then to the FFT, and then to the TDM. In some typical operations the TDDM prepares the data and turns on the FIR block. The FIR processes the data and when completed, turns on the FFT. Once the FFT block finishes, it turns on the TDM, and at the TDM completion, dumps the data into a memory and signals the completion to interrupt the CPU.

In some embodiments, the FCs are arranged as a series of slices where the CPU accesses all FCs and the FCs are tied to the CCB, which is a globally shared resource. The slice and CCB configuration allow for a very high level of parallelism in computation. The CCB and the FC soft interconnection is logically a soft interconnection architecture which connects many devices.

In some embodiments the embedded system comprises a family of slices. Here each different slice design in the family contains a different assortment of FCs. In some embodiments library blocks are added to the selected slice to increase the functionality. In some embodiments these standard library blocks are provided independently and separately from the slices, while in others they are not.

In some embodiments each slice executes different instructions on different FCs using different data streams. Here, after each FC has completed its task, it passes the results to the next FC, and waits for the next instruction. Therefore, the FCs are each synchronized to one another and are capable of passing data amongst themselves. In some embodiments once the slice completes processing its data it raises an interrupt to alert the CPU. Each FC has its functionality is configured by software running on the CPU, and the interconnect between the FCs is also configured by the software running on the CPU. So an embodiment can perform many different dedicated functions by configuring and connecting the system, using only those FCs needed for its implementation.

Figure 8:
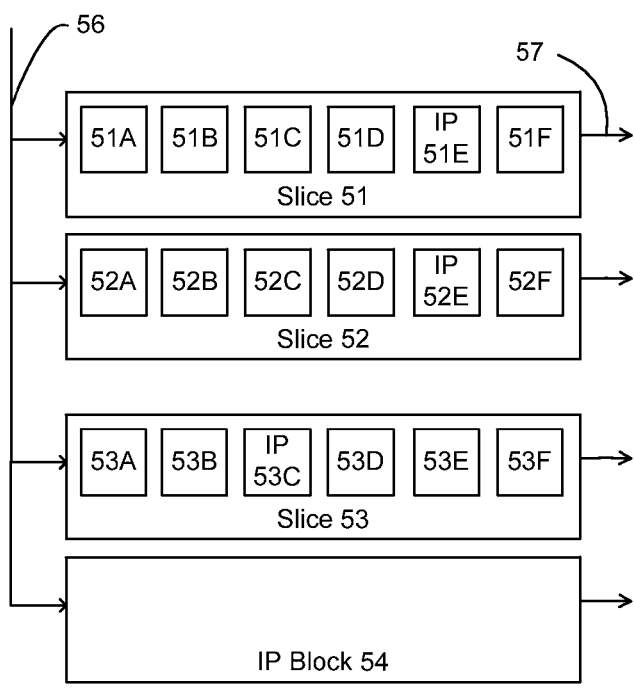
FIG. 8 illustrates an exemplary configuration of slice arrangement.

FIG. 8 illustrates a configuration of slice arrangement for some embodiments. The chip, such as an FPGA, is partitioned into a plurality of slices 51-54, accessed through a global bus 56 and connections 57. There is a plurality of FCs in a slice, for example FCs 51A-51F in slice 51. In some embodiments an IP block occupies whole slice, i.e., the slice 54 is an IP block. Alternately in some embodiments an IP block, e.g. 51E, is embedded in a slice, e.g. 51. In some embodiments the IP blocks are disposed separately at optimal locations for maximum performance and density. In some embodiments IP blocks are incorporated into a slice as a FB, implemented similarly to other blocks in a design.

In some embodiments the FCs in a slice are the same. In some embodiments they are different. There is a plurality of different slice types where each slice type has the same FC. In this exemplary embodiment, slice 51 and 52 are the same type with the same FCs, slice 53 is a different type of slice and slice 54 is an IP block. In some preferred embodiments the implementation of functional blocks within a slice, and the distribution of slice types within a chip is analyzed and predetermined to service a family of applications. The contents of a slice and the types of slices in an IC are based on the family of applications. In an exemplary embodiment targeting a DSP-application slice contains input ports, a TDDM (1 stream→N streams), an FIR, an FFT and a TDM, or an IP block Viterbi.

In some embodiments, the FCs in different types of slices are configured in various configurations. In some of these embodiments, the FCs within the same slice type are arranged in a same configuration, effectively for performing parallel processing. In some embodiments when there are not enough slices of the same type, slices of different types are also configured in this same configuration. In some embodiments slices of the same type are configured differently to provide different functionality. There is enough flexibility in configuring the FCs and slices, with a possible limit being the availability of FCs and slices.

The configuration is performed by software. So after the program is loaded into the CPU, the CPU uses an initialization process to configure the FCs and the slices. This soft configurability lets a chip of the present architecture service a whole family of applications.

In some embodiments the slices have a same configuration, allowing parallel processing of the same process, similar to a SIMD computing mechanism. In some embodiments the slices have different configurations, allowing parallel processing of different processes, similar to MIMD computing mechanism. In some embodiments the slices are chained together to provide serial processing, for example, one long chain for SISD mechanism, and many parallel chains for SIMD or MIMD mechanisms. In some embodiments the present architecture provides massive parallelism, with virtual unlimited scalability for highly cost effective expansion.

In a SIMD (single instruction, multiple data stream) computer, all the processors simultaneously execute an identical instruction with different data set. The main processor is tightly coupled to maintain synchronous operation of the various processors while each processor independently operates upon its data stream. In a MIMD (multiple instructions, multiple data stream) computer, the processors are decoupled and execute instructions independent of the other processors, using an instruction memory and program sequencer logic associated with each processor.

The present architecture combines SISD, SIMD and MIMD architectures. Instructions within a slice are sequentially operated. Instructions supplied to different slices having same configuration can all be operated from a single instruction. Instructions supplied to different slices having different configurations can all be operated from multiple instructions. In some embodiments the individual functional blocks and slices are selectively decoupled from the others to perform individual tasks, and to provide the result to the other blocks or main processor.

In some embodiments the architecture provides for 256 slices. The exact number of slices in an embodiment depends on particular implementation, and expansion capability, which allows some flexibility in the underlying logic design without requiring changes to the software, and on how the designer wants to design the connections of the FCs within the slices. The connections are used to form custom circuitry such as configurable mixed-signal functions.

Figure 9:
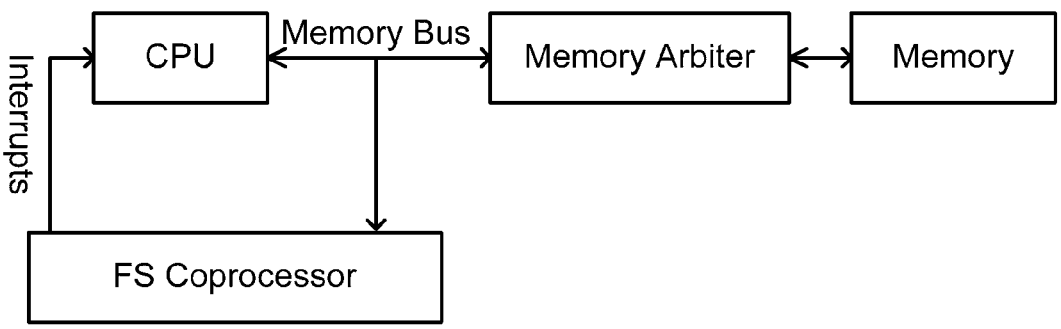
FIG. 9 shows an exemplary SOC architecture, comprising a CPU and a functional structure (FS) coprocessor.

In some embodiments the present architecture provides large flexibility while alleviating a core problem of control congestion. FIG. 9 shows an exemplary flexible SOC architecture, comprising a CPU, a functional structure (FS) coprocessor (including slices of functional components, and component control block (CCB)), together with other peripherals including memory, communication protocol assemblies such as Ethernet or UART components. In some embodiments the FCs include digital logic that contain at least 16 bits of state, and 16 simple gates of logic. Examples of FCs include FIRs, FFTs, Reed Solomon Decoders, and DES encryption/decryption engines. The CCB is a logic component. Every FC communicates the CCB. For an embodiment the designer chooses which FCs to use and their associate memory size based on what functionality they want the system to have. The designers choose how the software interconnects these components also based on this.

In some embodiments he present architecture reduces control congestion by reducing the requirement of CPU interactions. For example, there is a limit to a CPU capability in service a number of slave devices. In a typical system not of this architecture the CPU starts each slave device on its respective task, and when a slave finishes its current task, it raises an interrupt for the CPU to intervene, possibly by starting the slave again on some other task. When the number of slave devices exceeds the capability of the CPU, for example hundreds or thousands of slave devices, then the CPU is strained into servicing all these slave devices, and performance may suffer.

Figure 10:
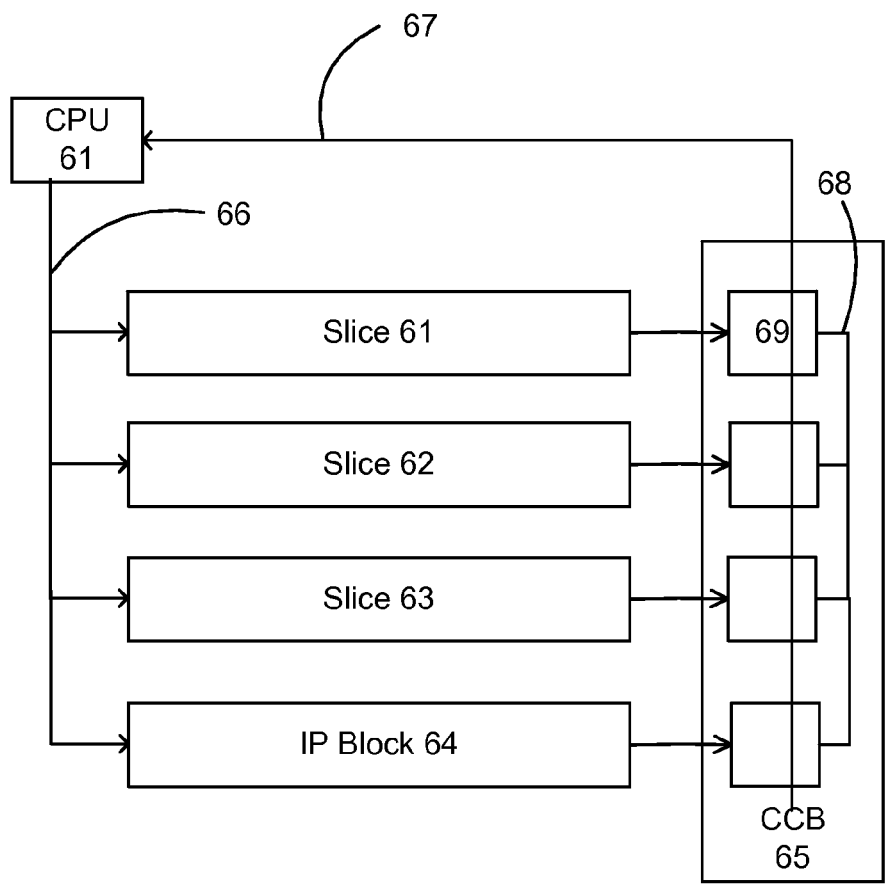
FIG. 10 illustrates an exemplary system configuration with a plurality of slices.

FIG. 10 illustrates an exemplary system configuration, including a CPU 60 controlling a plurality of slices 61-64 through a global bus 66. The slices are connected to a CCB 65, with interrupt signals 67 back to the CPU 60. The number of slave devices are reduced significantly with the slice configuration, and thus congestion to the CPU is reduced accordingly.

Figure 11:
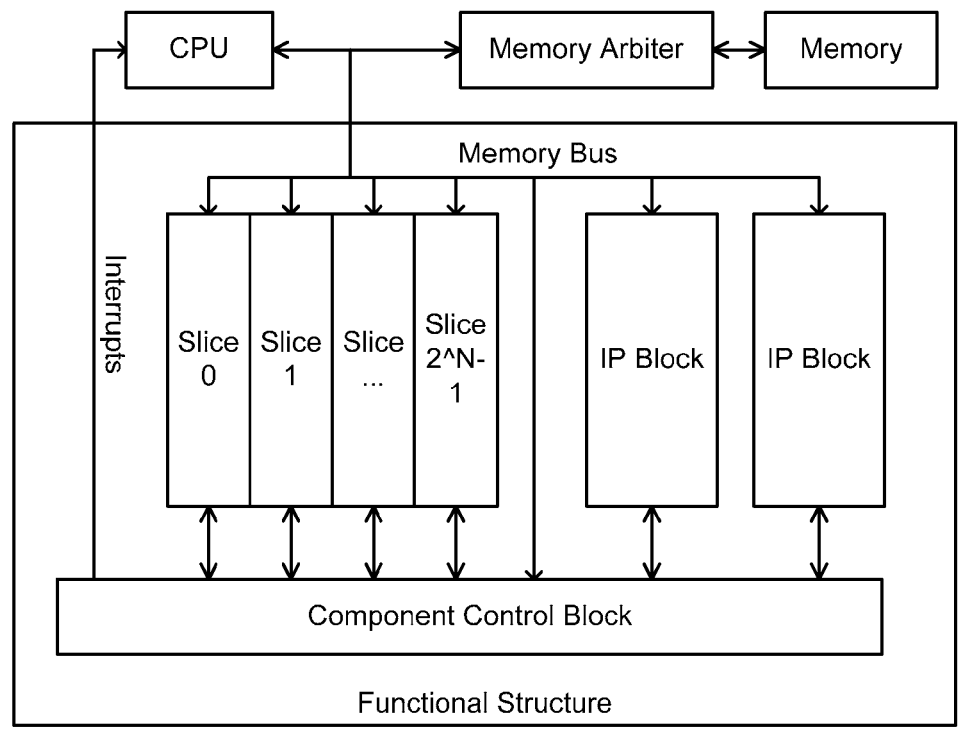
FIG. 11 illustrates another exemplary architecture with slices.

In some embodiments, the present architecture relieves this congestion by grouping the number of slave devices into slices, effectively reducing the number of slave devices that the CPU needs to service (FIG. 11). The control of the slices is passed to the CCB, so that data flows from one device, e.g., a functional block, to the next with predetermined control by the CCB and without the CPU intervention. In some embodiments IP blocks are also incorporated within this scheme. In general once a particular device finishes its operation, it informs the CCB that it is complete. Then the CCB turns on the next device in line to process that data. The CCB can also wait until multiple devices are completed before starting another device. The CCB acts autonomously, without the CPU intervening, and therefore capable of reducing control congestion for the CPU.

In exemplary embodiments, the CCB comprises a plurality of sections with each section covering a plurality of slices. For example, the FCs in slice 61 are connected to section 69 in the CCB 65. Also in an aspect, not all CCB bits connect to every FC in a slice. The connection is typically determined for a given implementation, where each CCB bits is connected to a particular FC. The sections can provides interrupts 67 to the CPU, together with local bus 68 for communication between the sections. In an embodiment, each CCB bit is connected to every FC. In a preferred embodiment, the FCs in each slice are connected to a section in the CCB, thus reducing interconnections between the FCs and the CCB bits. The missing connections can be covered by the local bus 68.

2. Implementation Design

The present invention further discloses implementations of functional components and slices for various family of applications. The implementation is chosen to map well with a variety of applications, ensuring enough power and devices in the implementation to meet the needs of the application, well-matched against the application to minimize surplus in die area, memory, and/or clock speeds, and still serve the need at hand, and having the right components for the application. Various metrics could be built into the slice and stored in local memory or output on debug channels. These include, but are not limited to, timestamps, throughput, memory collisions, FC timing and activity.

Figure 12:
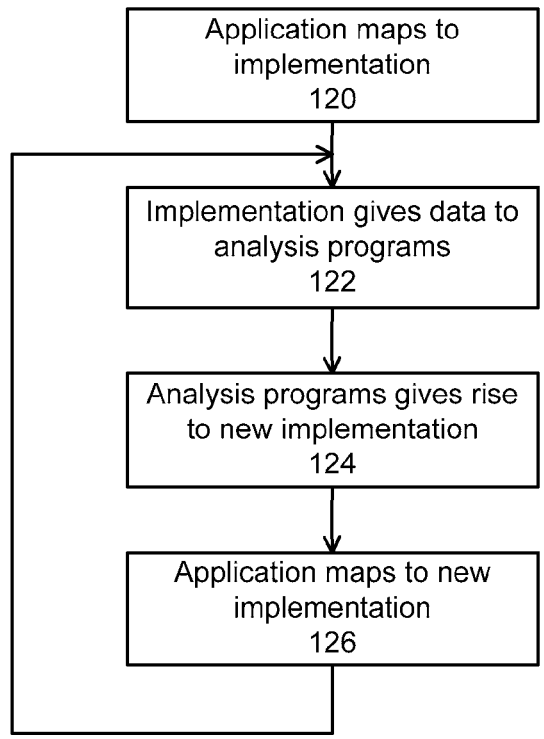
FIG. 12 illustrates an exemplary feedback loop to prepare implementations.

In some embodiments, a feedback loop is employed using software to analyze how the application fits onto the implementation (FIG. 12). An application is mapped to an existing implementation and available metrics, providing data to an analysis program. The program calculates what FC is used and how often. If the fit is not good enough in some way, this knowledge is used to generate another implementation. For example, the FC that often used can be duplicated and multiplied and the FC that is not used can be reduced or eliminated. The application is then mapped to the new implementation, and the feedback loop continues.

Figure 13:
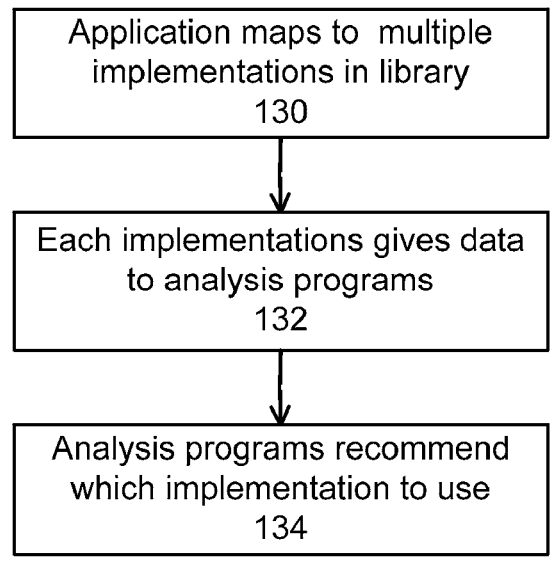
FIG. 13 illustrates an exemplary process to mapping applications to existing implementations.

Over time, a library of implementations is built and a software is then used to analyze a given application's needs (FIG. 13). For example, an application is mapped to the available implementation in the library, which can undergo an analysis program to recommend a particular implementation based on those needs.

3. Software Component

The system described here comprises a hardware architecture, a software architecture, a programming model, and a flow methodology.

The hardware architecture typically comprises a CPU, global memory, various analog peripherals, a global memory bus, and a plurality of slices, functional components and component control block. In some embodiments the present architecture includes various analog peripherals, depending on the specific application. For example, some embodiments implementing DSP functionality have A/D's, D/A's and antennas. Some embodiments implementing networking applications will have SER/DES interfaces.

The present architecture is CPU-agnostic with low control congestion. Thus any microprocessor is suitable. Some embodiments have MMUs and others do not. Some embodiments that have an MMU will use it; others will not.

This system significantly reduces control congestion reduction because the CPU does not need to get involved in detail control of individual functional blocks, but only to set up the CCB, the arbiters, and the logical blocks. Once the whole engine is started, the CPU's involvement is minimal.

Ultimately the CPU controls the whole system. At any given time the CPU observes and/or controls any other given component in the system if it is programmed to do so. In some embodiments, however, the CPU delegates a significant portion of control to the CCB. Thus this architecture utilizes distributed control flow to reduce data congestion.

The present system includes a software programming model. On reset the CPU initializes various system components, such as chaining functional components and slices, using register writing. For example, the chaining sets up a string of DSP functions in a sequence. The whole design then waits for data to come in. The system components process the data with no CPU intervention. In some embodiments the system components interrupt the CPU. In some embodiments the CPU queries the system as it runs, for debugging, checking status, and dataflow analysis.

The present invention further discloses a system infrastructure, providing a means of rapidly developing a prototype for an application, a means to analyze a prototype, allowing developers to see easily what can be improved, and advises to developers on the selection of library design implementation given a set of requirements.

After a determination of the logic blocks, the infrastructure model assigns the logic blocks to memory address ranges after checking for conflicts, and generates the register definition files and the API for the other pieces of software to use.

The designers can start with a digital design implementation (DDI) for rapid prototype with functional descriptions. The system has a library of DDI's, together with an expert system to help the users decide which DDI in the library is appropriate for prototyping a given application. The software programming model offers C language API to program, with a register map showing how every register is memory-mapped. At the point the user has defined his application in software on top of the DDI, the model analyzes the utilization of the DDI to determine which pieces are necessary for a final product and which are not. It emits a record of this. The digital designers use this to help them implement the final product. The number of local memories is analyzed and excess memory is removed for the final product.

During runtime, the CCB track the process time of each functional block. This information is used to turn down the clock speeds for each functional block in the final product for power optimization.

Figure 14:
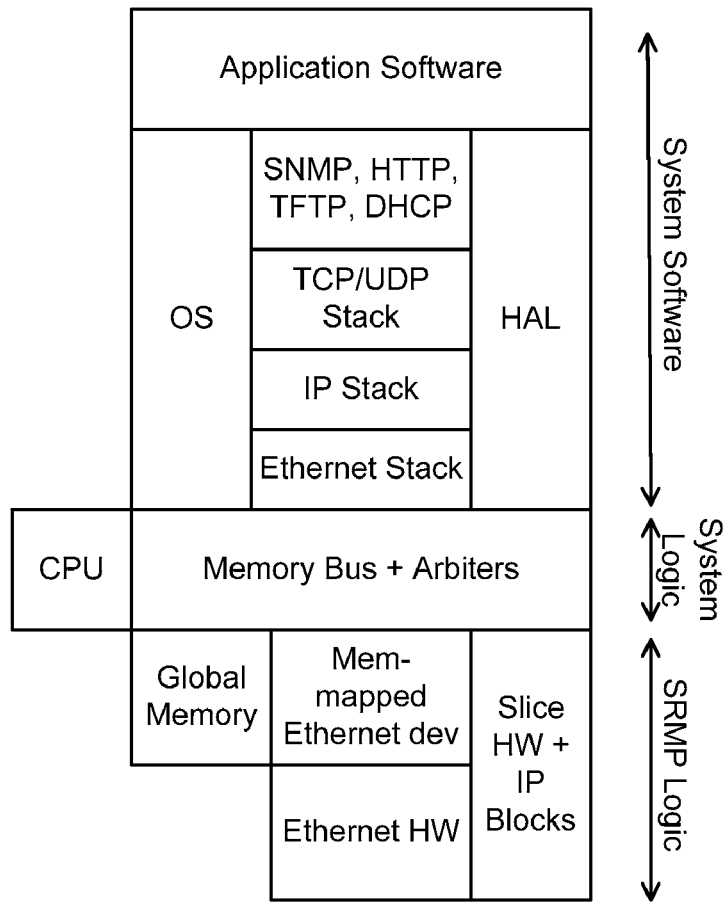
FIG. 14 illustrates an exemplary hardware/software stack according to embodiments of the present invention.

FIG. 14 illustrates an exemplary hardware/software stack according to embodiments of the present system. The hardware stack comprises a device stack 70, which includes slices hardware and IP blocks 70A, communication block such as Ethernet hardware 70B, memory mapped Ethernet devices 70C, and global memory 70D. The hardware stack further comprises a system logic 71, which includes a CPU 71B and memory bus and arbiters 71A. On top of the hardware stack is the software stack 72, which comprises a hardware abstraction layer (HAL) 72A, the communication stack which includes the Ethernet stack 72B, the IP stack 72C, the TCP/UDP stack 72D, and the stacks of SNMP, HTTP, TFTP, DHCP 72E, together with the OS stack 72F, and the application software 72G.

The software HAL sits on top of the CPU, the memory, and the hardware, which the CPU accesses as memory-mapped registers. The HAL (Hardware Abstraction Layer) provides an interface layer for higher-layer software to access the slice hardware and other IP blocks. There is also an Ethernet stack for communication, so the device is accessible over Ethernet. Finally depending on the application in question, there may be higher level software that runs on the system.

The software further includes RDL (Register Definition Language), which is a simple language by which registers and their addresses are defined. It provides abstract names to all registers, which are memory-mapped. The input view of RDL is a file that describes each register, plus its mappings. This can replicate multiple instances as different things. One output view of this is the register definition, specifying each register in the design along with its memory map address.

The HAL is a thin layer of abstraction. It allows the higher layers of software to access the registers in the Slices and the IP blocks with some abstraction. It is implemented as a set of C function calls, which the C language calls use the HAL registers to access the functional blocks.

The software can be implemented for optimizing the connections of the FCs. By monitoring the FCs, for example, through a counter in the CCB for the usage of these units, and how often they are on, the characteristics of the connections for the circuit can be determined. Thus from a code stand point, the CCB connections can be changed and the performance measured. Various connections can be analyzed, and the software can determine an optimize set of CCB connections for the FCs with respect to desired performance, such as low power consumption or fast response.

Some embodiments have other peripheral digital devices in the overall system besides the CPU and the FS. To include these in the interface, their register definitions are added for the access registers to the RDL. The regular memory is accessed normally by the CPU, without the need to go through the HAL.

The software architecture is OS-agnostic. However, the hard real-time nature of the applications at hand requires the operating system be hard real-time. And it is desirable the OS have a small memory footprint. Some examples of this include MicroC/OS and eCOS. In some embodiments the OS runs on the CPU for control functions.

The Ethernet stack, IP stack, TCP/UDP stack, and the software above it—the SNMP stack, the HTTP stack, the DHCP stack and the TFTP stack—is a series of software modules to allow communication, which are designed for testing devices. Also, it is useful for a device in the field to be able to communicate by this method. In some embodiments these functions are present. In others these functions are not essential and are removed for cost effectiveness.

The HAL (Hardware Abstraction Layer) is located in the bottom of the programming model. It is a thin layer of abstraction. It allows the higher layers of software to access the registers in the Slices and the IP blocks with some abstraction.

The software is toolchain-agnostic. In some embodiments it uses the GNU tool suite, which includes gcc for compiling, gdb for debugging, and ancillary tools such as the BFD. When the system turns on the system the OS starts a thread. This thread initializes all the components in the system—all the slices, the IP components, the CCB, etc. Once this all happens the system is ready to run. This thread turns off. If the system requires other threads, for instance to monitor the Ethernet and to run the communications stacks, then the OS also starts those threads.

In some embodiments the system includes more software support, such as code to assign memory addresses to all the slices, IP blocks and CCB and software to generate the HAL.

Some embodiments of this system are implemented on a machine or computer readable format, e.g., an appropriately programmed computer, a software program written in any of a variety of programming languages. The software program is written to carry out various functional operations of the present system. Moreover, a machine or computer readable format of the present invention may be embodied in a variety of program storage devices, such as a diskette, a hard disk, a CD, a DVD, a nonvolatile electronic memory, or the like. The software program, known as a simulator, may be run on a variety of devices, e.g. a CPU.

Figure 26:
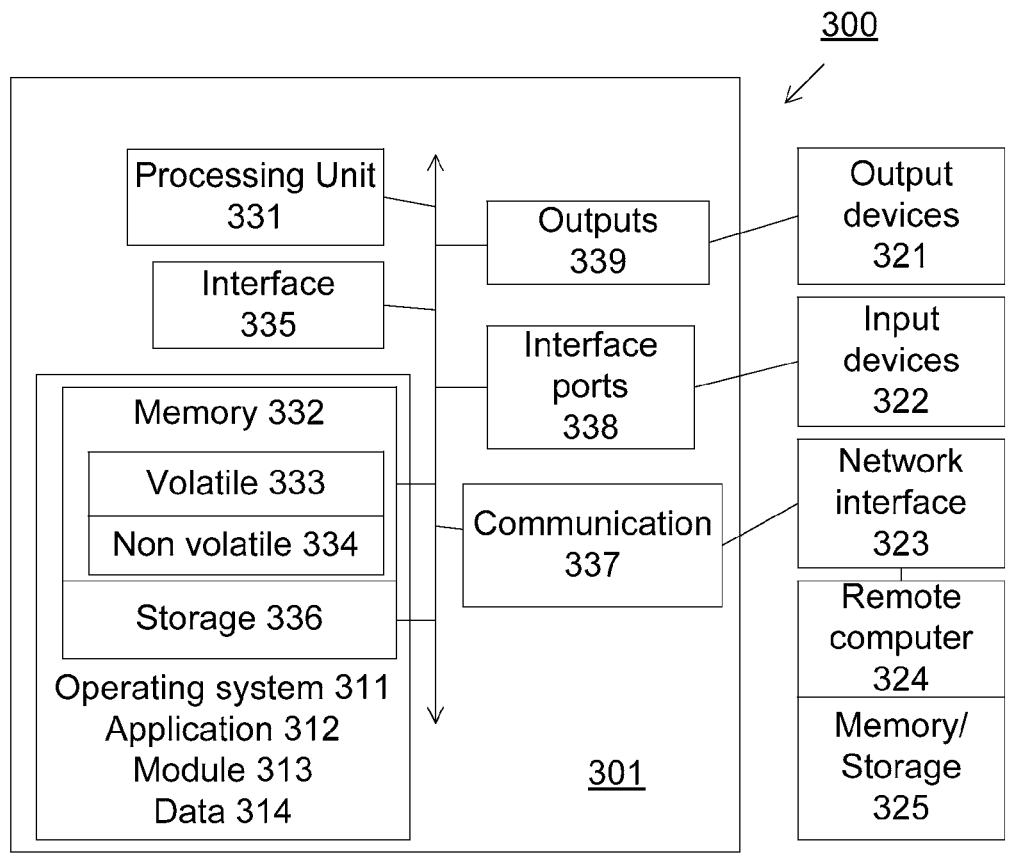
FIG. 26 illustrates an exemplary computer system which can be used in the present invention.

With reference to FIG. 26, an exemplary environment 300 for implementing various aspects of the invention includes a computer 301, comprising a processing unit 331, a system memory 332, and a system bus 330. The processing unit 331 can be any of various available processors, such as single microprocessor, dual microprocessors or other multiprocessor architectures. In various embodiments the system bus 330 is of diverse types of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), or Small Computer Systems Interface (SCST).

In some embodiments the system memory 332 includes volatile memory 333 and nonvolatile memory 334. Nonvolatile memory 334 refers to read only memory (ROM), programmable ROM (PROM), electrically programmable ROM (EPROM), electrically erasable ROM (EEPROM), or flash memory. Volatile memory 333, refers to random access memory (RAM), synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), or direct Rambus RAM (DRRAM).

Computer 301 also includes storage media 336, such as removable/nonremovable, volatile/nonvolatile disk storage, magnetic disk drive, floppy disk drive, tape drive, Jazz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). In some embodiments removable or non-removable interface 335 is used to facilitate connection.

In some embodiments the computer system 301 further includes software to operate in environment 300, such as an operating system 311, system applications 312, program modules 313 and program data 314, which are stored either in system memory 332 or on disk storage 336. In different embodiments various operating systems or combinations of operating systems are used.

In some embodiments input devices 322 are used to enter commands or data, and include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 338. Possible interface ports 338 include a serial port, a parallel port, a game port, a universal serial bus (USB), and a 1394 bus. In some embodiments the interface ports 338 also accommodates output devices 321. such as a USB port, to provide input to computer 301 and to output information from computer 301 to an output device 321. Output adapter 339, such as video or sound cards, is provided to connect to some output devices such as monitors, speakers, and printers.

In the exemplary embodiment computer 301 operates in a networked environment with remote computers 324. The remote computers 324, shown with a memory storage device 325, can be a personal computer, a server, a router, a network PC, a workstation, a microprocessor based appliance, a peer device or other common network node and the like, and typically includes many or all of the elements described relative to computer 301. embodiments such as this remote computer 324 connect to computer 301 through a network interface 323 and communication connection 337, with wire or wireless connections. In some embodiments network interface 323 are communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 27:
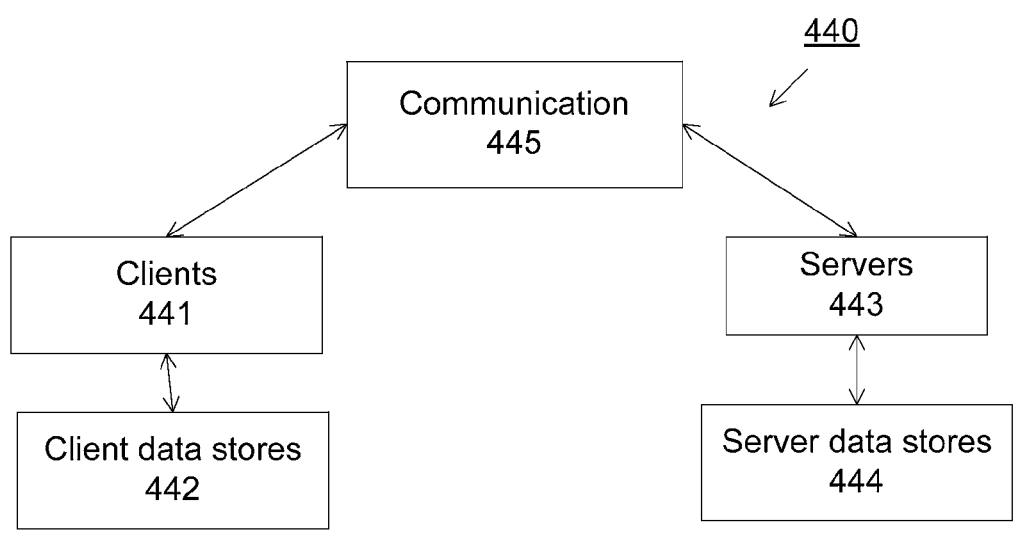
FIG. 27 illustrates a schematic block diagram of a sample computing environment.

As an exemplary embodiment FIG. 27 shows a schematic block diagram of a sample computing environment 40 with which the present invention can interact. The system 440 includes a plurality of client systems 441. The system 440 also includes a plurality of servers 443. In such an embodiment the server 443 is used to employ the present invention. The system 440 includes a communication network 445 to facilitate communications between the clients 441 and the servers 443. Client data storage 442, connected to client system 441, can store information locally. Similarly, the server 443 can include server data storages 444.

4. Architecture to Address Memory Congestion

Typically, a parallel processing computer contains a plurality of processors coupled to one another by a data stream bus and an instruction bus. The processors typically share local memory via the data bus.

Global bus is adapted to support data transfer between the slices, the main processor, and I/O controller. The global bus is configured to carry both instructions and data. Memory bus congestion occurs if every time a device needs to read or to write data, it does so on the global memory bus. If dozens or hundreds of devices try to access the global memory bus at the same time, then the bus itself would become the bottleneck.

The present system is different from this. In some embodiments the present architecture has local memories interspersed throughout the IC for reducing memory congestion. When a device attempts to access a memory location in a local area slice, the access goes directly to that local memory and not to the global memory bus.

Thus memory data access is often the bottleneck forcing long stalls on parallel processor systems, mainly due to the sharing registers and buses. In some embodiments memory contention is significantly reduced with the present massively parallel architecture.

In some embodiments, in the IC floorplan, the memories are distributed throughout the chip area, often uniformly. Thus the present slices and bands attempt to exploit this geographic locality. In an embodiment, the IC is built on an underlying geography—or floorplan—of a functional structure where logic is randomly spread throughout the device, and memories are somewhat evenly distributed.

Figure 15:
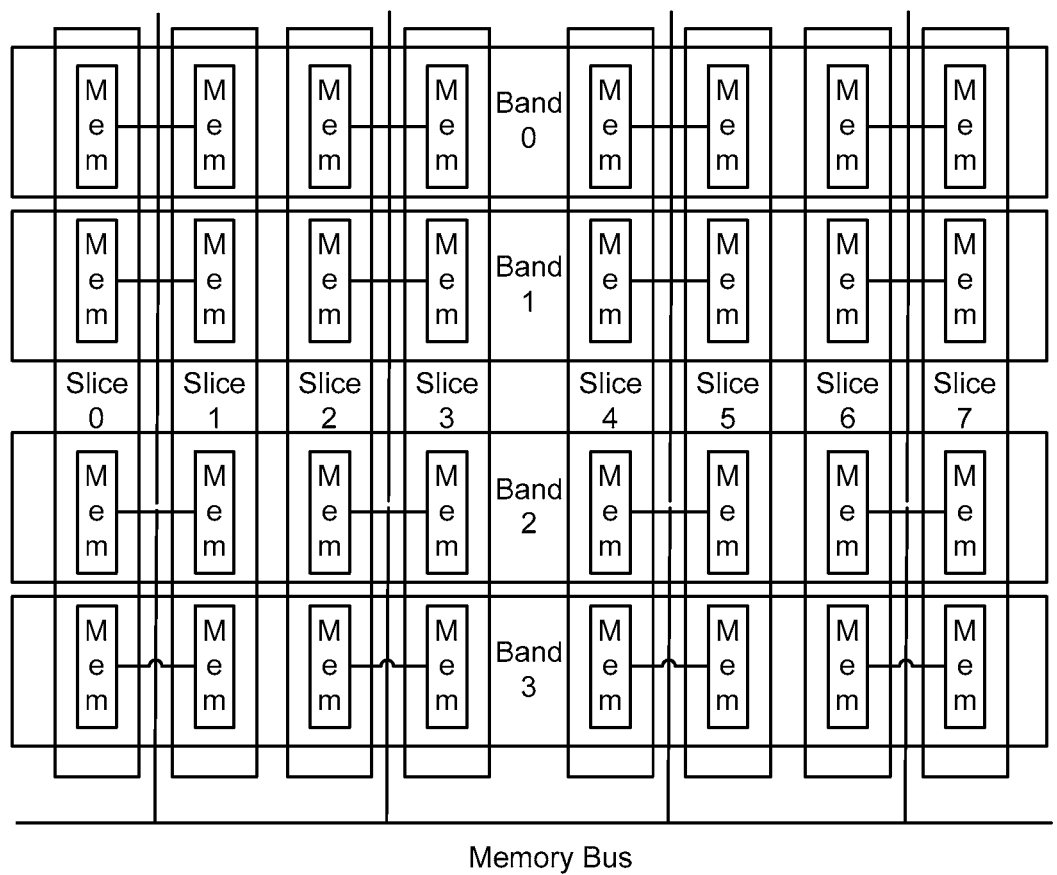
FIG. 15 shows an exemplary floorplan with slices and bands.

FIG. 15 shows an exemplary floorplan with slices and bands, using slice local memory bus and band local memory bus. Slices are series of functional components interspersed with local memories and run e.g., north to south. When a functional block inside of a slice accesses a memory local to that slice, then that access stays local and does not go out to the system memory bus. This minimizes traffic and thus contention on the global memory bus. Similarly bands are logical constructs that run perpendicular, e.g., east to west. When a functional block inside a band accesses a memory local to that band, then that access stays local and does not go out to the system memory bus.

Figure 16:
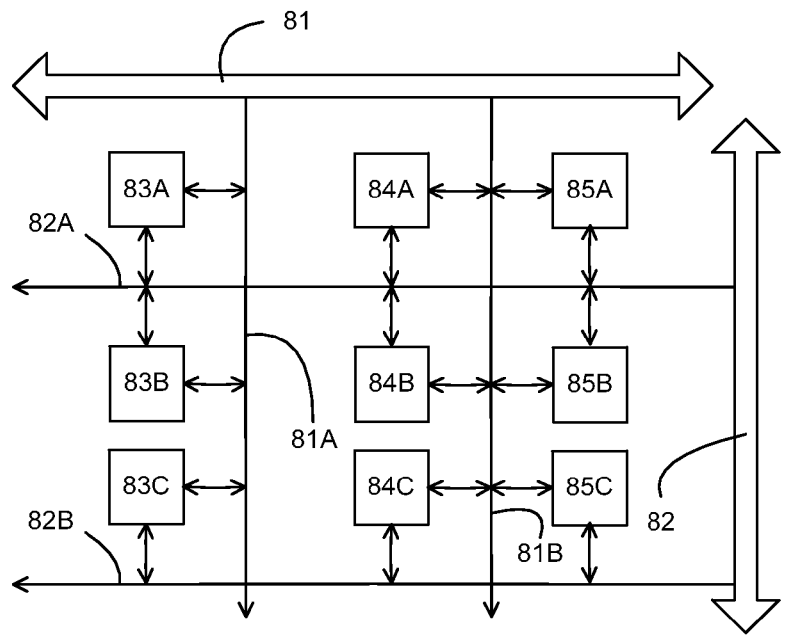
FIG. 16 illustrates an exemplary local bus configuration.

FIG. 16 illustrates an exemplary configuration, showing global memory buses 81 and 82 and a plurality of memory 83A-C, 84A-C, and 85A-C. To reduce memory congestion, local memories 83A-85C are dispersed throughout the IC area, together with local memory bus 81A, 81B and 82A, 82B. Local memory buses 81A and 81B can run vertically, and connected to global memory bus 81. Local memory buses 82A and 82B can run in another direction, for example, horizontally, and connected to global bus 82.

Thus memory 83A, 83B and 83C can be connected through vertical slice local bus 81A without a need for global memory bus. Similarly, memories 84A-84C and 85A-85C are also connected through vertical local memory bus 81B. Further, memories 83A, 83B, 84A, 84B, 85A and 84B can be connected by horizontal band local memory bus 82A. Similarly, memories 83C, 84C, and 85C are connected by horizontal band local memory bus 82B. Thus the distributed memories are connected with vertical slice local bus (81A or 81B), or horizontal band local bus (82A or 82B). Only when access is outside of the local area, for example, when memory 83A needs access to memory 84C, then global memory bus is used. With proper incorporation of local memories buses, this global memory bus access is significantly reduced, leading to high memory congestion reduction.

Some embodiments address memory congestion with memory arbiters where most data traffic is through the local bus between memory arbiters. The arrangement of local memory arbiters amounts to a small local memory bus, connecting a few of the memories.

Figure 17:
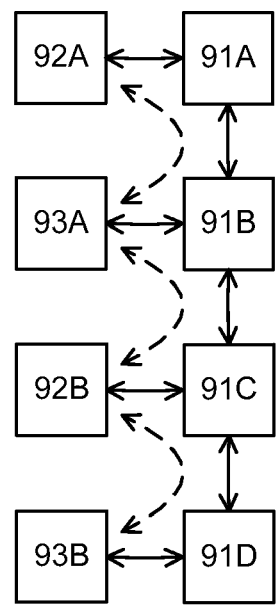
FIG. 17 illustrates an exemplary local arbiter configuration.

Alternatively, in some embodiments, memories can be connected through arbiters. FIG. 17 illustrates an exemplary embodiment of 2 devices 93A and 93B, with 2 local memories 92A and 92B, connected through the local arbiters 91A-91D. Arbiters 91A and 91C are memory arbiter, controlling access to the memory 92A and 92B. Arbiter 91B and 91D are device arbiter, controlling access to the device 93A and 93B. With this configuration, device 93A can access memory 92A through the device arbiter 91B and memory arbiter 91A. Similarly, device 93A can also access memory 92B through arbiters 91B and 91C. With memories dispersed around the device, memory access is routed through the arbiters, thus relieving global memory bus congestion.

Figure 18:
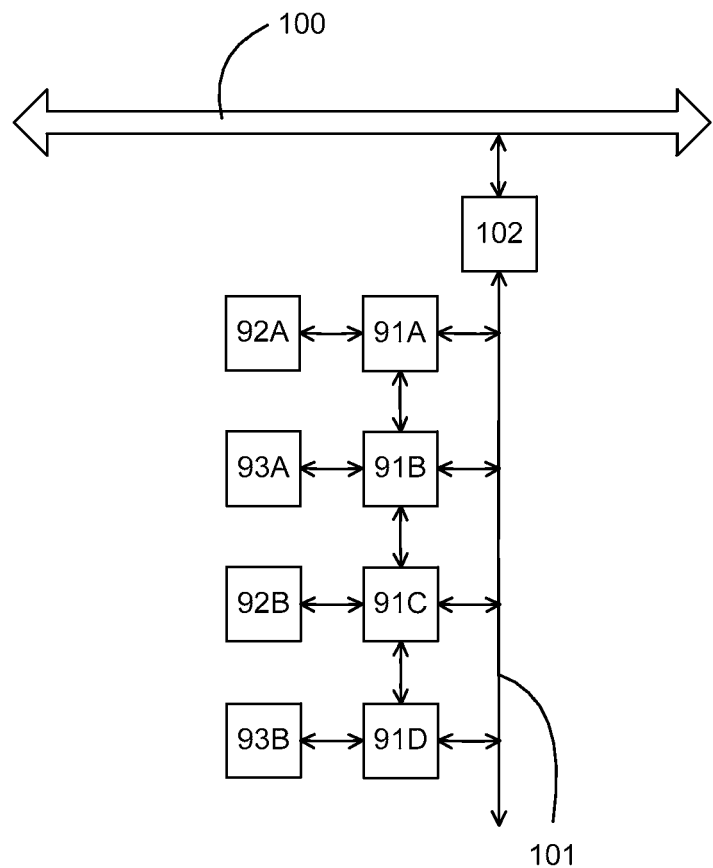
FIG. 18 illustrates an exemplary embodiment comprising local memory bus and arbiter configuration.

Alternately, in some embodiments, local memory bus and arbiter configuration are combined. FIG. 18 illustrates an exemplary embodiment, showing a global memory bus 100, connecting two local memory buses 101A and 101B through two bus arbiters 102A and 102B respectively. In each local memory bus, the device arbiters and the memory arbiters are controlling the device and the memory, respectively, in terms of communication with the local memory buses. With such a configuration, very local communication is made through the arbiter. Local communication is also made through the local memory bus. And communications outside the local area are made with the global memory bus, which can be designed to be a rare occurrence.

Figure 19:
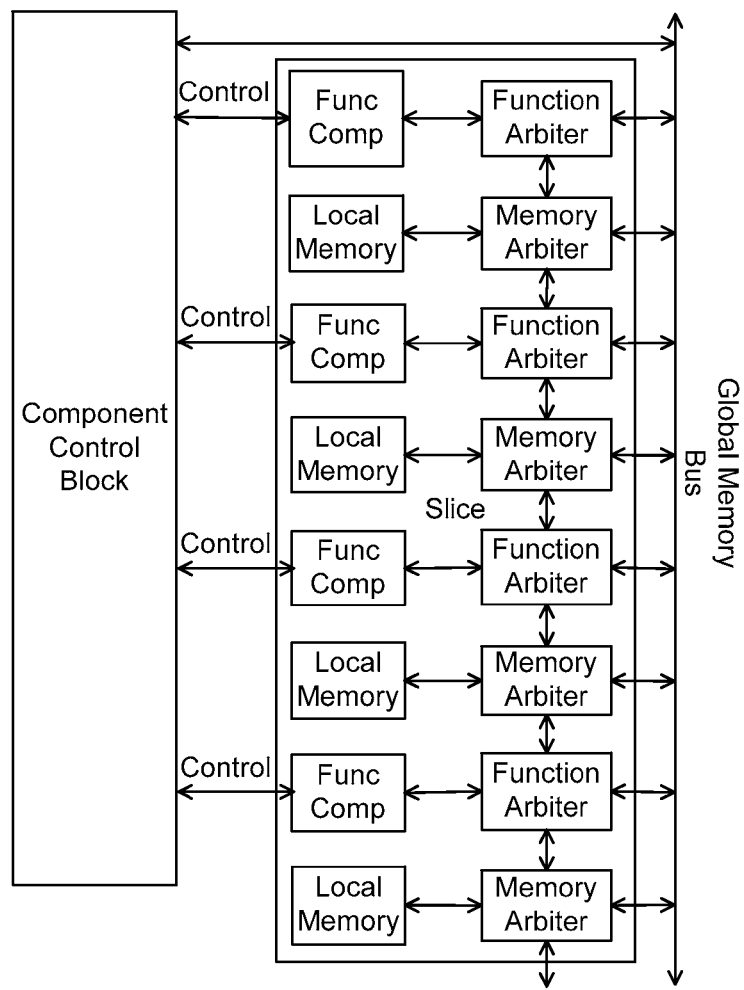
FIG. 19 shows another embodiment of a slice configuration with functional components, memories and arbiters.

FIG. 19 shows another embodiment, illustrating the functional components, memories and arbiters disposed within a slice, and connected to a CCB and outside slice memory bus.

Figure 20:
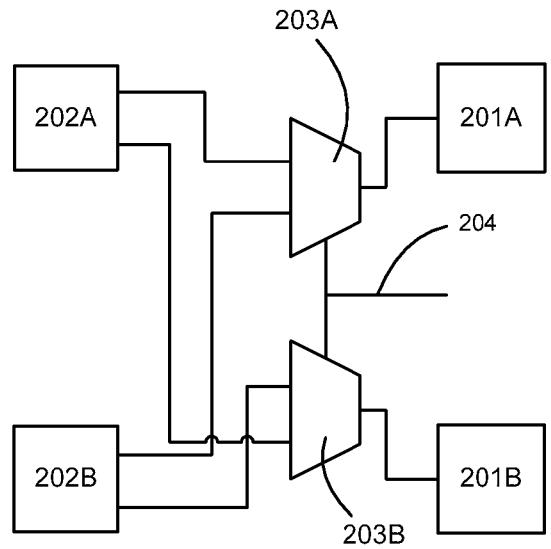
FIG. 20 shows an exemplary embodiment of memories and functional component distribution for reducing memory congestion.

FIG. 20 shows another embodiment of memory configuration for reducing memory congestion. Memories 202A and 202B are alternatively connected to FCs 201A and 201B through, for example, multiplexers 203A and 203B. An exemplary operation can be as followed. FC 201A runs, receiving and generating data from memory 202A through control signal 204 guiding the multiplexers 203A. When FC 201A completes processing, control signal 204 switches, and now FC 201A receives and generates data from memory 202B. In the mean time, FC 201B runs, receiving and generating data from memory 202A. When the FCs complete processing, the control signal switches, causing the FCs to access alternative memory. This configuration can reduce memory congestion, since no memory needs to be transferred. The multiplexer is an exemplary embodiment, and other implementation can be carried out for switching memories between a plurality of FCs. Further, the above example uses two memories and two FCs, but any number of memories and FCs can be used.

Figure 28:
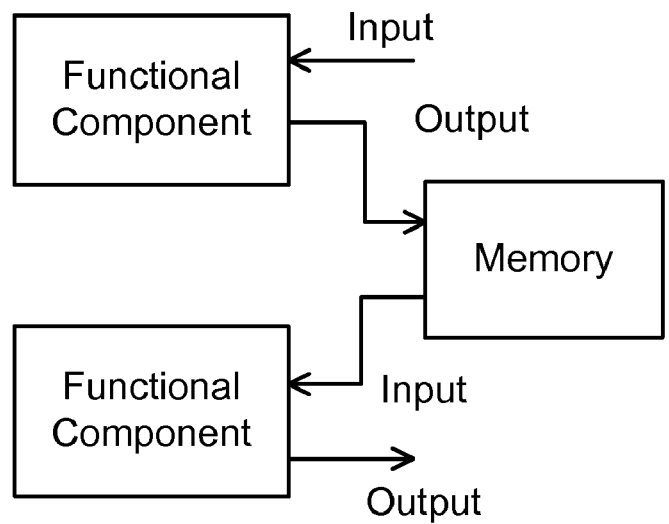
FIG. 28 illustrates an exemplary memory sharing configuration between two functional components to reduce memory data transfer.

FIG. 28 illustrates a general block schematic of a distribution of a memory device between two functional components where the first functional component can write to the memory device and the second functional component can read from the memory device. The functional components are preferably running in series, with the second functional component starts execution after the completion of the first functional component. With this memory arrangement, input data for the second functional component is ready immediately after the output data from the first functional component is written. Thus memory data transfer can be significantly reduced, and in this case, there is no memory data transfer.

Figure 29:
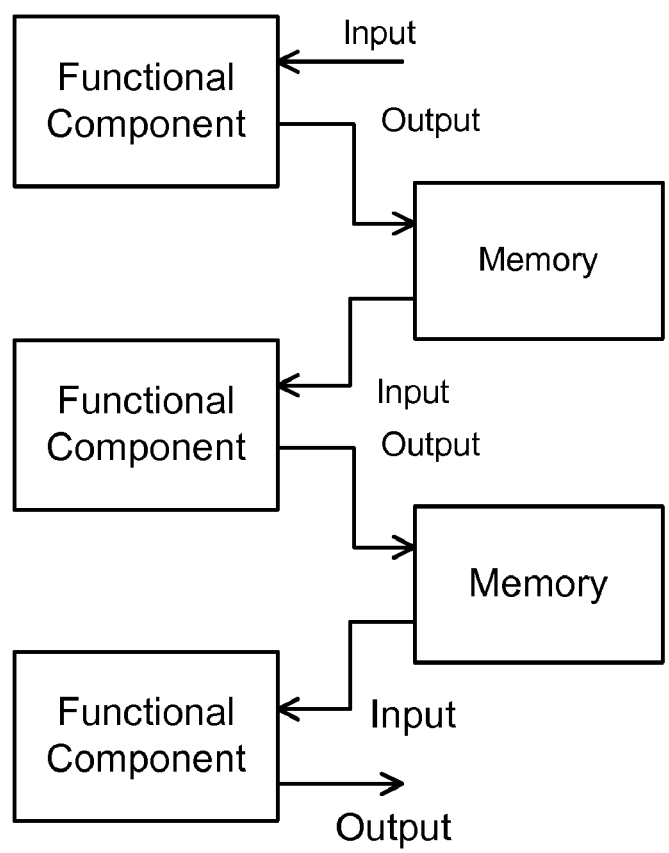
FIG. 29 illustrates an exemplary memory sharing configuration between three functional components.

FIG. 29 illustrates a block schematic of a chain of functional components linking to a plurality of memory devices. A first functional component generates data to a first memory, which then supplies to a second functional component. The second functional component writes data to a second memory, which then supplies to a third functional component. The functional components run in series, one after another, and the memory data is automatically ready for the next functional component after the completion of the previous functional component.

Figure 30:
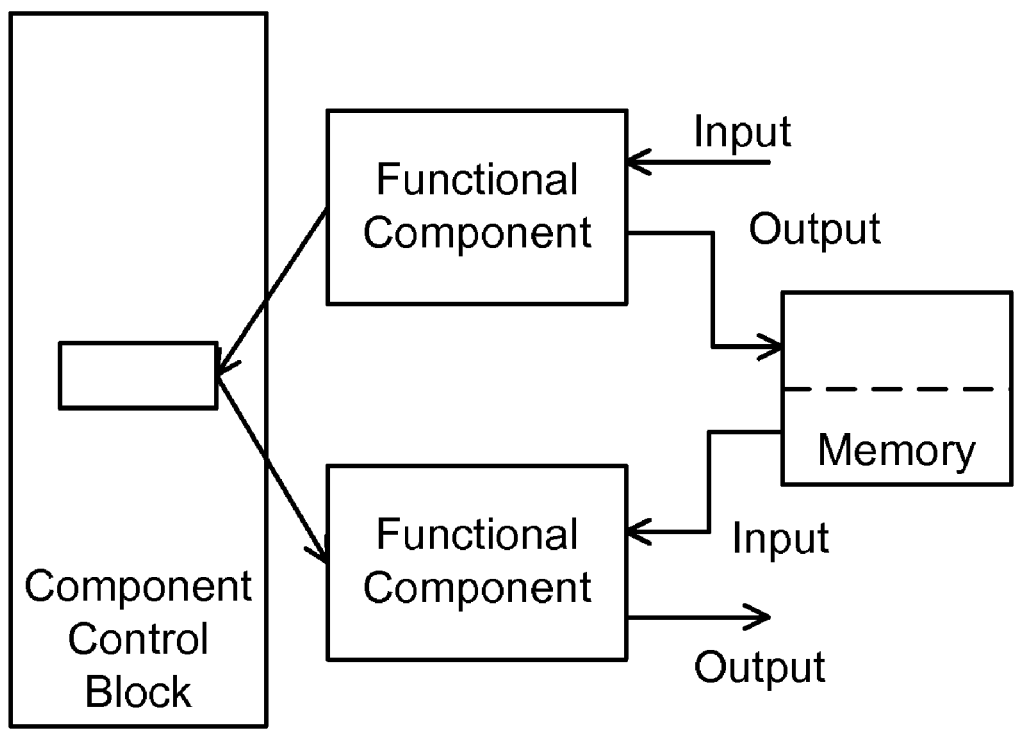
FIG. 30 illustrates an exemplary memory sharing configuration where the memory is partitioned into two portions.
Figure 31:
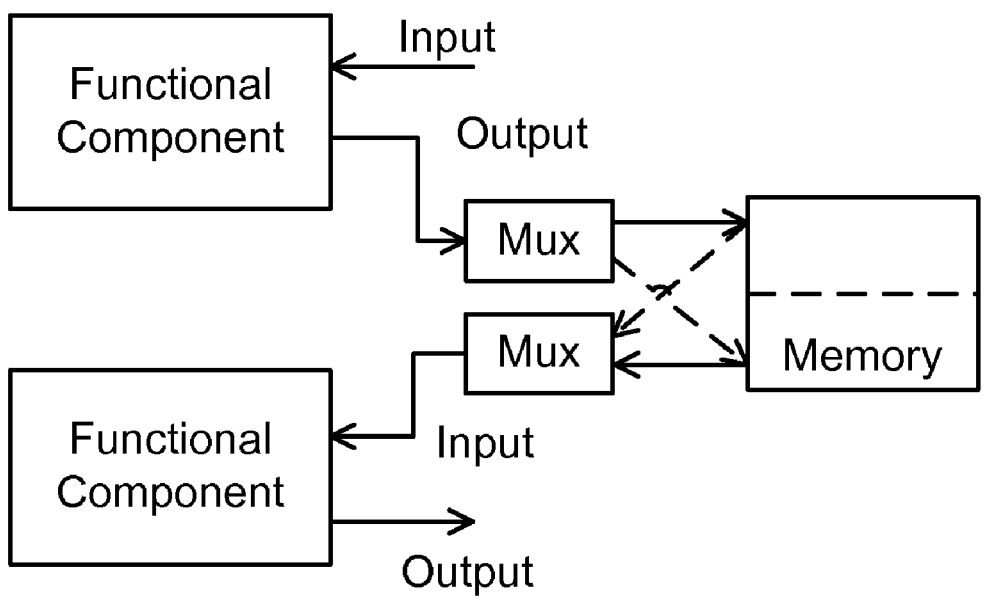
FIG. 31 illustrates an exemplary memory configuration with a mux controller to control the connections between the functional components and the memory.

In an embodiment, the functional components are linked together by a component control block, so that the functional components can be executed in series (or parallel depending of the desired configuration) as shown in FIG. 30. In an aspect, the memory is preferably partitioned into a plurality of portions (two shown) to support the two functional components at the same time. For example, the first memory portion can be used to receive output from a first functional component, and the second memory portion can be used to provide input to a second functional component. FIG. 31 illustrates another embodiment where the memory is partitioned into two portions. The circuit further includes a switching component, shown as two multiplexers (MUX), to switch the portions of the memory device. In a first state, the muxes provide connections from the first/second portions of the memory to the first/second functional components. After the functional components complete processing, the circuit switches to a second state where the muxes provide connections from the first/second portions of the memory to the second/first functional components. In this embodiment, the functional components can process simultaneously without any data transferring.

Figure 32:
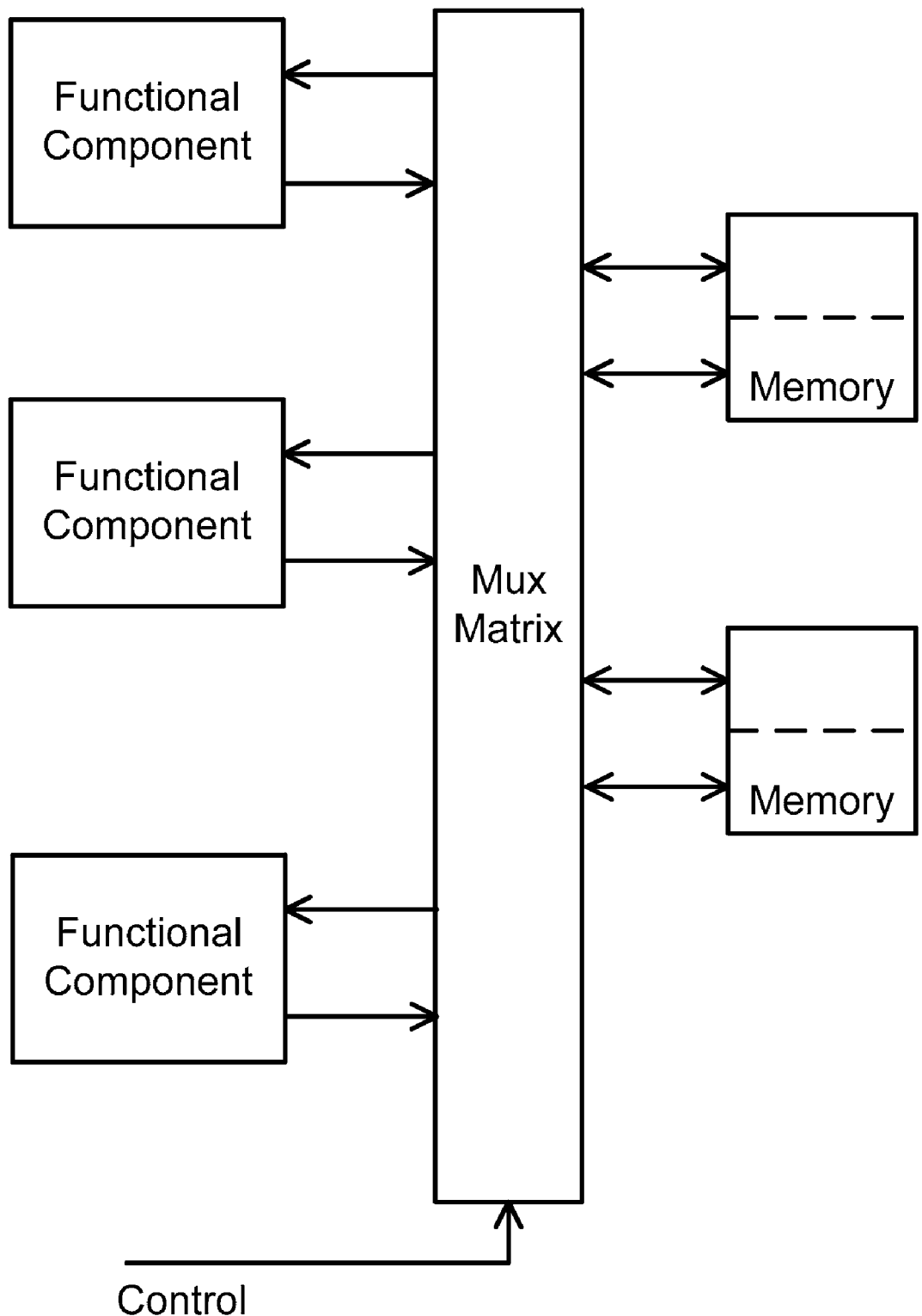
FIG. 32 illustrates an exemplary memory sharing configuration between a plurality of functional components and a plurality of memory devices.

FIG. 32 illustrates a configuration of a plurality of functional components connected to a plurality of memory devices through a switching matrix such as a mux matrix. Each functional component can read and write data from different portions of a same memory device or from different memory devices, controlled by a control signal to the mux matrix. This circuit allows various chaining configuration of the functional components, and provides the memory input and output to the chain configurations with minimum memory data transfer.

Figure 33A:
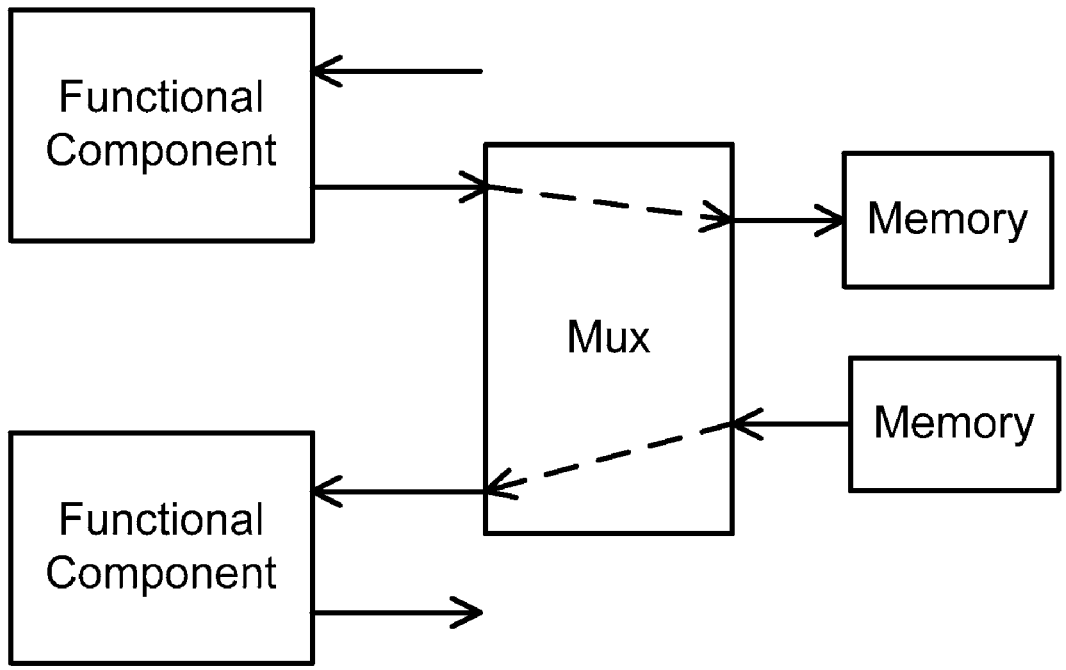
FIGS. 33A and 33B illustrate two states of a MUX controller for switching connections between functional components and memory devices.
Figure 33B:
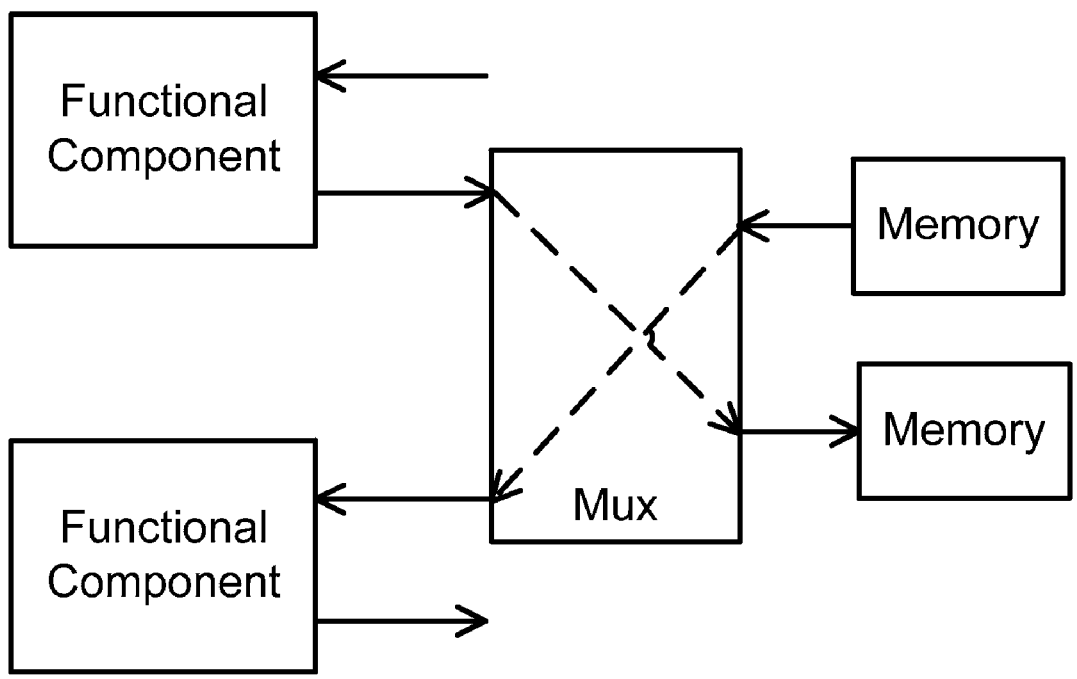
Figure 34:
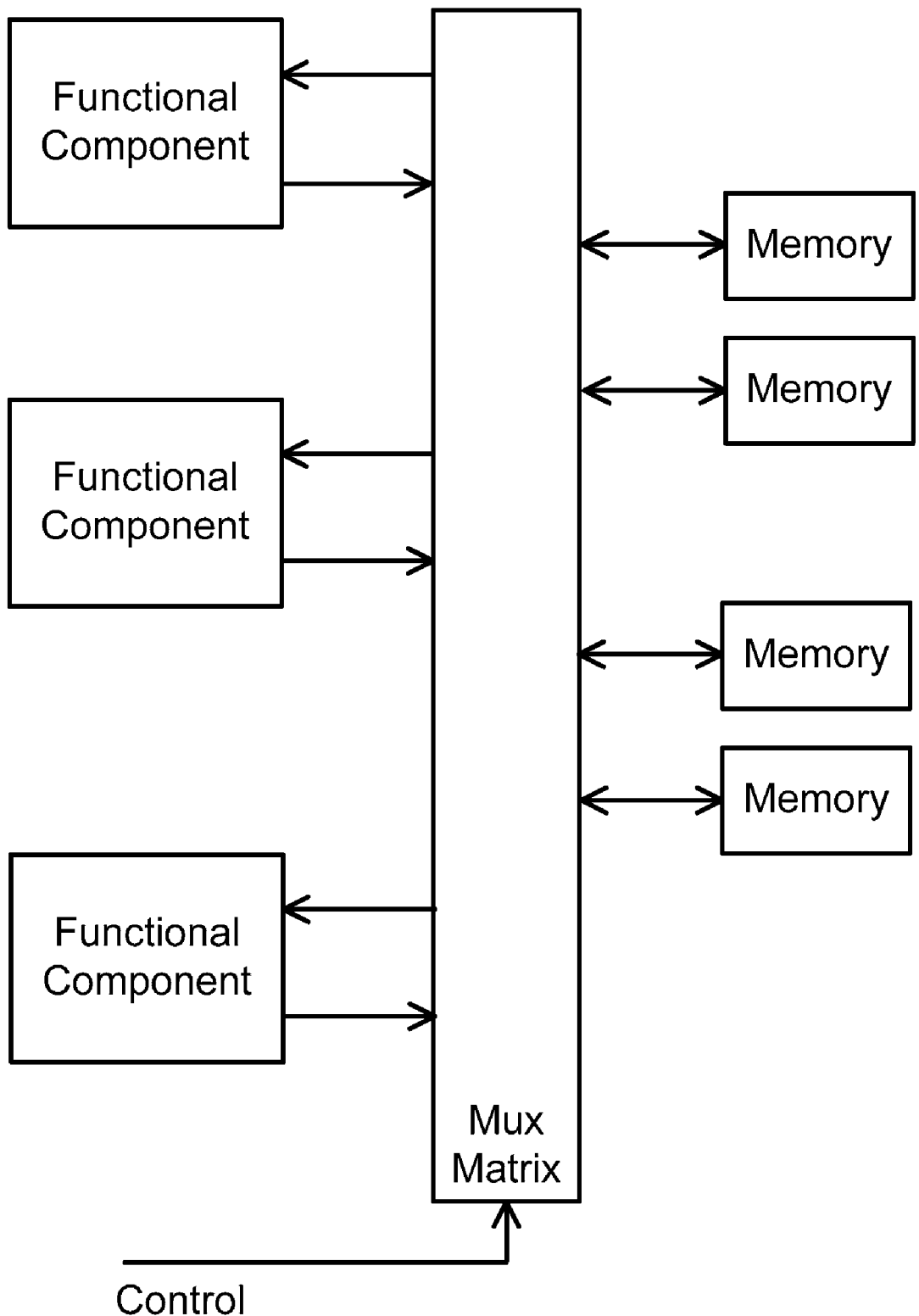
FIG. 34 illustrates another exemplary memory sharing configuration between a plurality of functional components and a plurality of memory devices.

In another embodiment, there can be a plurality of memory devices instead of a plurality of portions of memory. FIG. 33 illustrates two memory devices connected to two functional components through a switching component such as a mux matrix. FIG. 33A illustrates a first state where the mux runs parallel, and FIG. 33B illustrates a second state where the mux run crosswise to connect the devices. Similarly, there can be a plurality of functional devices and a plurality of memory devices connected through a connection block such as a mux matrix, as shown in FIG. 34.

5. Architecture to Address Control and Memory Congestion

Some embodiments of the present system combine control congestion reduction with slice architecture and memory congestion reduction with local bus and arbiter configuration. The configuration comprises multiple slice sections, comprising a series of functional components interspersed with local memories. In some aspects, the FC and the local memory each have a dedicated memory arbiter. In such an aspect the FCs and the local memories can be positioned next to each other, thus an FC has access to two local memories on each side by going through the memory arbiter for that memory. Alternatively, in some embodiments the slice contains a slide memory bus, to service the request for data within a slice. The memory arbiter and the slice memory bus free much traffic from the global memory bus, relieving data congestion and contention on the global memory bus.

In some aspects, the processing unit contains IP blocks with dedicated memories and arbiters. Here the arbiter for an IP block is connected to a plurality of slice arbiters to access data from the slices. This configuration provides local memory access, thus improving congestion within the global memory bus. In some embodiments an IP block memory arbiter is also connected to global memory bus.

In some embodiments, the present processing unit contains a Component Control Block (CCB). The CCB enables the chaining a series of predefined functional components, performing the connections between the functional blocks. After proper chaining, when a functional component or IP block finishes its operation, it uses the CCB to start the next functional component or IP block to continue the process, processing its data outputs. In some embodiments a portion of the CCB includes interrupts to the CPU to request CPU assistance, such as the completion of a slice operation. Not all CCB bits need to connect to every FC. The circuit design and implementation determine for a given embodiment and functionality, which CCB bits connect to which particular functional components. This design prevents needless congestion for the CCB.

Figure 21:
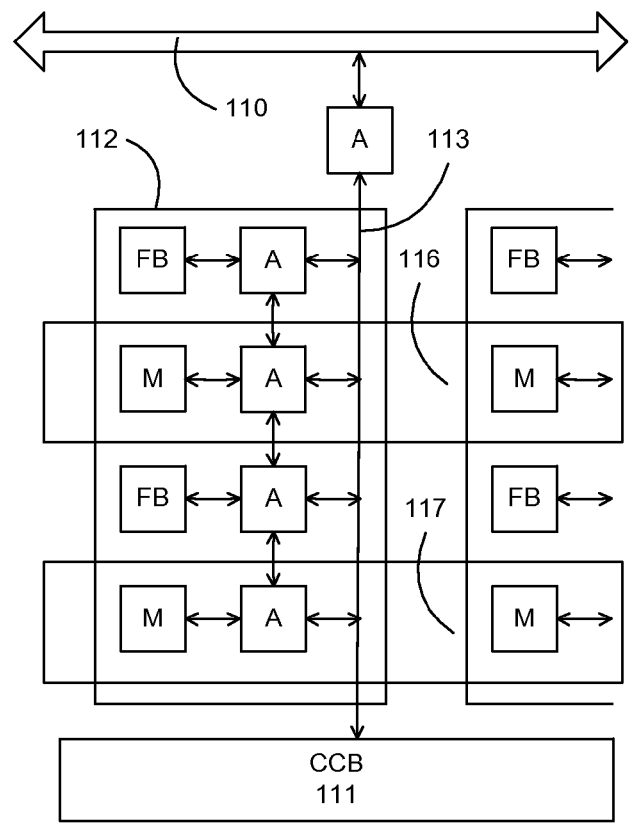
FIG. 21 illustrates a slice configuration with memory arbiter and local memory bus.

FIG. 21 illustrates a slice configuration with memory arbiter and local memory bus. A slice comprises a series of local memories and a series of functional components. A local memory bus 113 connects the global memory bus 110 and pass through the slice 112 to the CCB 111. Each functional component has a dedicated memory arbiter. And each local memory has a dedicated memory arbiter. The functional components and the memory components in a slice logically alternate. Within the slice 112, functional components F are interspersed with memories M, and both are connected to the local memory bus through functional and memory arbiter A. If a functional component in a slice tries to access a logically adjacent memory component then its arbiter routes its request directly to the memory arbiter for that memory, rather than going to the memory bus. Otherwise the memory request goes out to the slice memory bus. With this configuration, slice functionality rarely needs to access the global memory bus 110, since the majority of actions and memory access are contained with the slice 112. The CPU has access to all functional components and the memories through the slice memory bus.

In another embodiment, the present processing unit comprises a CPU (central processing unit) which can monitor and control the whole system, including the CCB, the slices, the functional components and the IP blocks. The present architecture allows the CPU to supervise instead of independently control every component at the same time. After setting up the CCB, the memory arbiters and the flow control blocks, the CPU involvement is minimal and does not get involved in the operation of the individual functional components. In an embodiment the operation of the CPU is limited only to the handling of interrupts, or specific operations.

The CPU uses the memory bus, e.g., global and local, to access everything in the system. The CPU memory-maps all the registers in the system. The CPU uses this ability to initialize or reset the system and to query or set the various pieces of the system as the need arises. In some embodiments there are some global memory in the system, depending on the needs of the application at hand. Typically very little global memory is needed. The memory can be ROM, DRAM, SRAM, flash or any combination thereof. In another aspect, the internal memories distributed throughout the slices and the other IP blocks are primarily for local use, and not considered global memory, even though the CPU has access to them through the global memory bus.

Figure 22:
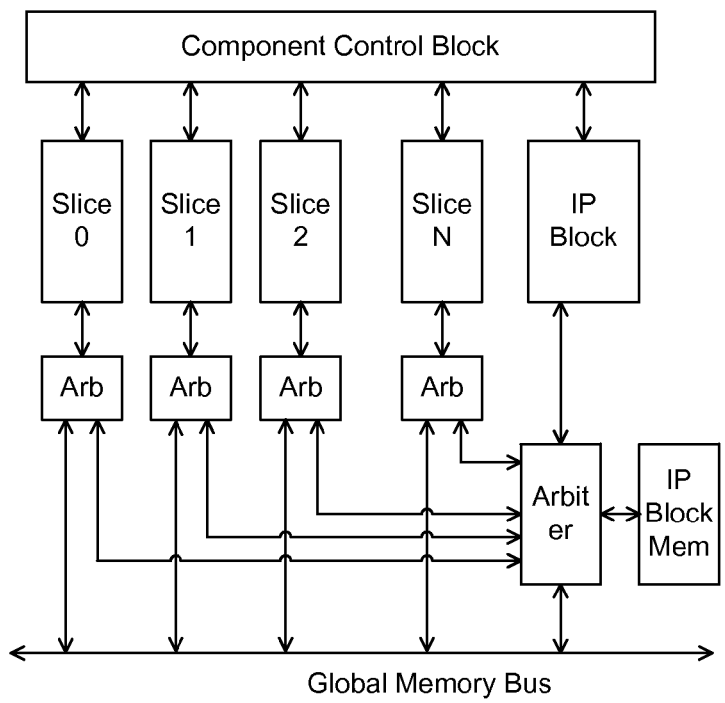
FIG. 22 illustrates an exemplary arbiter configuration for a plurality of slices and IP block.

In an exemplary embodiment the configuration, shown in FIG. 22, comprises slices, which are series of FCs interspersed with local memories together with slice memory bus and local memory arbiter connections. When components inside of a slice access a physically adjacent memory then that access stays local and does not go out to the system memory bus. This minimizes traffic and thus contention on the global memory bus. Further in this embodiment each slice and IP block has its own memory arbiter. A given IP block is chained to some slices through arbiter connection, providing local arbiter access instead of global memory bus access. In such an embodiment, every slice and IP block has a memory arbiter connected to the global memory bus.

Figure 23:
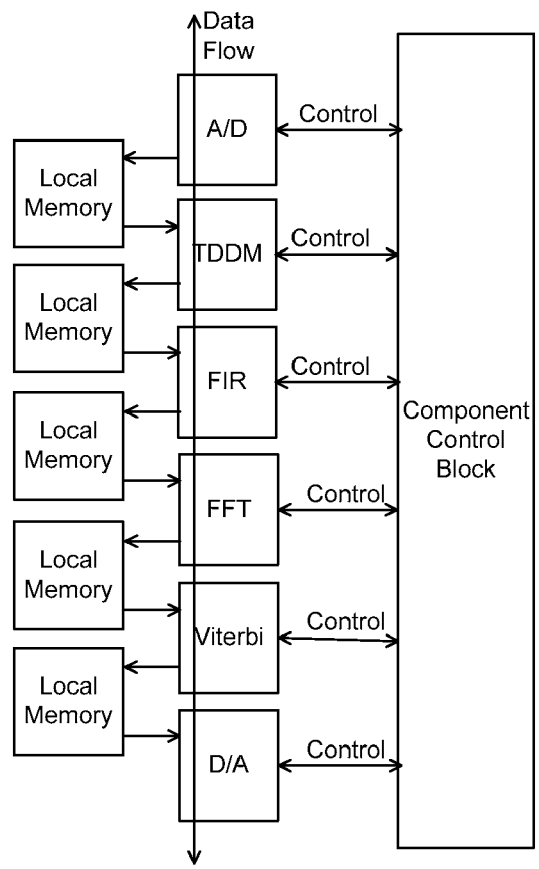
FIG. 23 illustrates an embodiment where various functional components are arranged in a slice.

FIG. 23 illustrates an embodiment where various functional components are arranged in a slice. The functional components are configured for a typical DSP application, chaining a series of functionality, starting from an A/D converter, passing to a TDDM block, continuing with FIR, FFT, IP block Viterbi, and finally to the D/A converter. The CCB controls the serial execution, with the local memory passing successively through each neighbor functional block.

Figure 24:
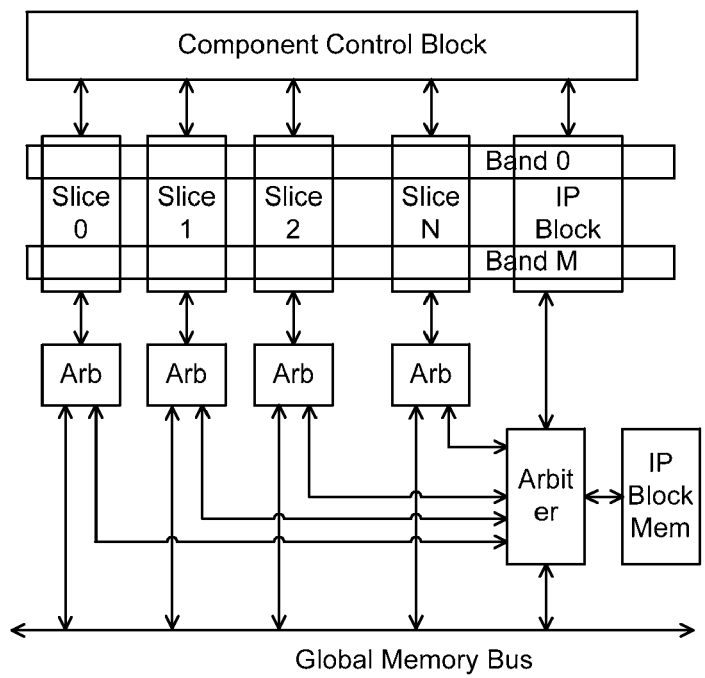
FIG. 24 illustrates an exemplary band configuration for a plurality of slices and IP block.

Further, in some embodiments the present architecture provides additional bandwidth through the additional band configuration, shown in FIG. 24. This design provides additional bandwidth for the high data flow, reducing flow congestion. For example, in some such embodiments, slices and IP block are connected through band memory bus, in addition to slice memory bus.

Figure 25:
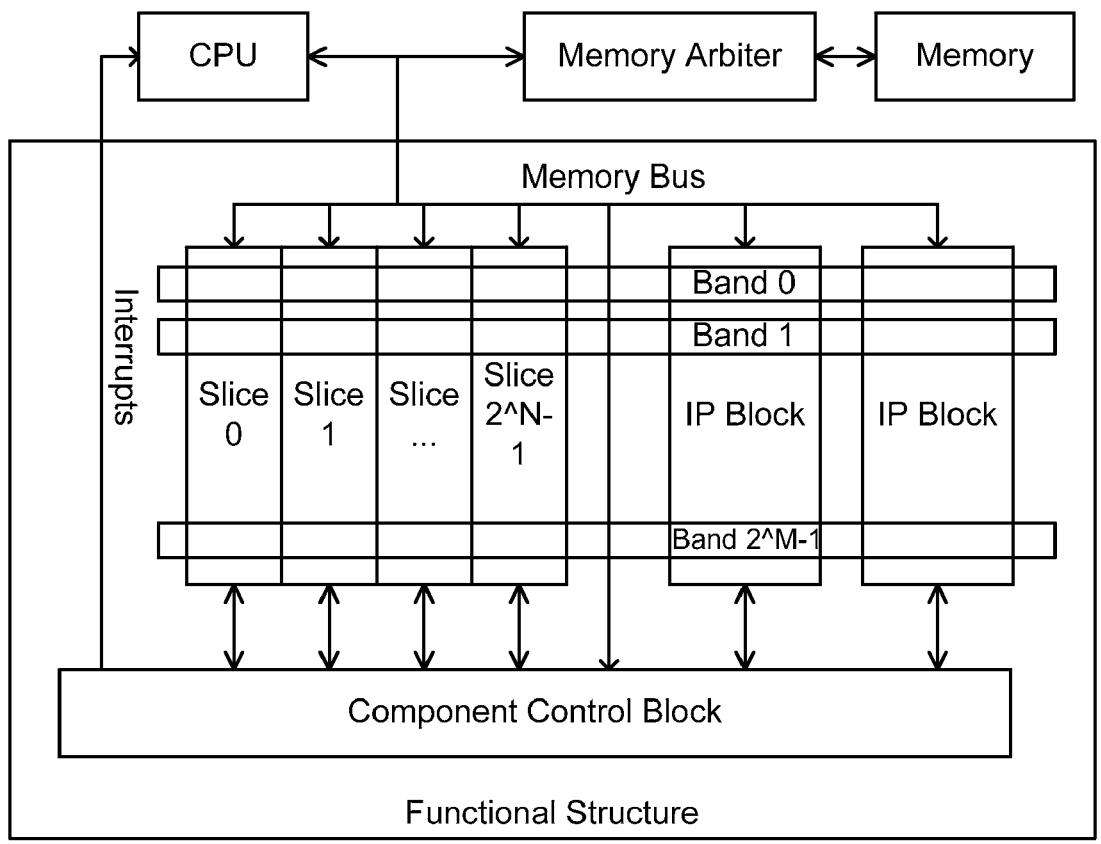
FIG. 25 shows an exemplary system configuration.

FIG. 25 shows an exemplary system configuration, further comprising a CPU for control the functional structure.

6. Reconfigurable Bus Fabric

Some embodiments of the present system disclose a configurable bus fabric for improving the flexibility in connecting the functional components. The present reconfigurable bus fabric comprises a plurality of data bus lines, intersecting each other with a multistate intersection. In exemplary embodiments, the multistate intersection comprises at least two states, a connecting state connecting the data bus lines, and a disconnecting state where the data bus lines are not connected. The bus fabric also can include a controller for changing the states of the multistate intersections. With the multistate intersection, the data bus lines are reconfigurable, providing different interconnect configurations, preferably by software control.

The data bus lines are preferably the interconnections in an integrated circuit, which provide data path to various devices within the integrated circuit. The data bus lines are preferably metal lines, such as aluminum or copper to carry signal from one part of the circuit to another part. The data bus lines can further comprise vias and contacts for interconnections between various interconnection levels.

Figure 35:
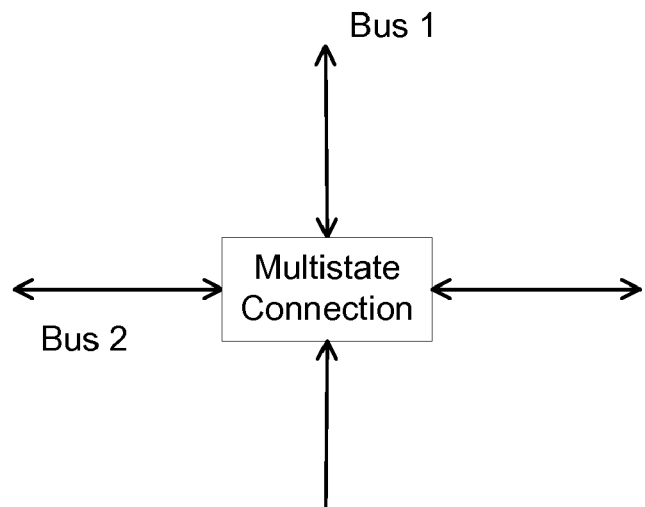
FIG. 35 illustrates an exemplary configuration bus fabric with a multistate intersection.
Figure 36A:
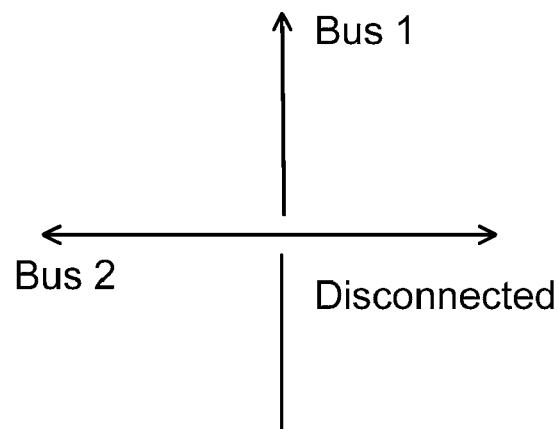
FIG. 36A illustrates a disconnected state for the multistate intersection.
Figure 36B:
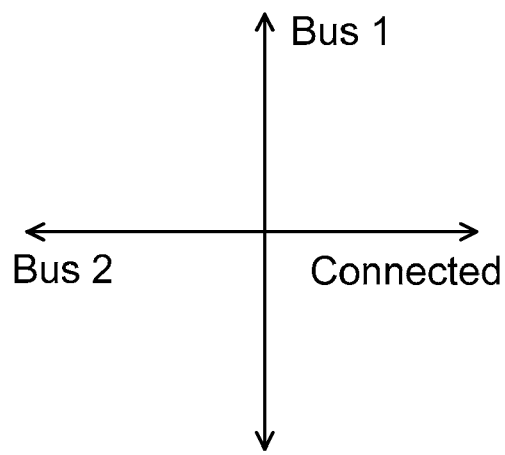
FIG. 36B illustrates a connected state for the multistate intersection.

FIG. 35 illustrates an exemplary bus fabric, comprising a bus 1 intersecting a bus 2 with a multistate intersection. FIG. 36A illustrates a disconnecting state of the multistate intersection, where bus 1 and bus 2 are disconnected. FIG. 36B illustrates a connecting state of the multistate intersection, where bus 1 and bus 2 are connected.

Figure 37:
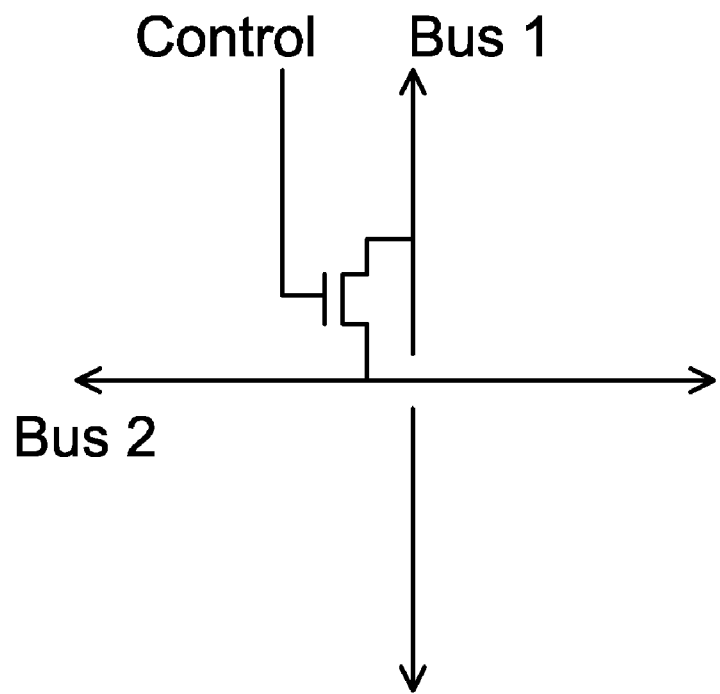
FIG. 37 illustrates an exemplary multistate intersection using transistor device.
Figure 38:
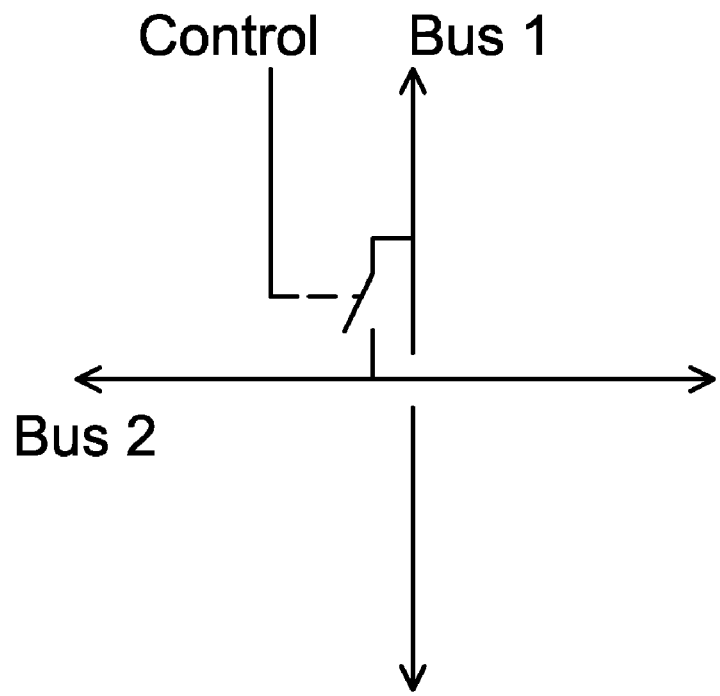
FIG. 38 illustrates an exemplary multistate intersection using MEMS device.

Implementations of the multistate intersections include active devices such as transistors (FIG. 37), or by MEMS devices (FIG. 38). The multistate intersection can include a control line for controlling state of the intersection. For example, a control line connected to the gate of a transistor (FIG. 37) can control the source and drain to provide different states of connections of the transistor. A control line controlling the cantilevel of a MEMS device can connect or disconnect a multistate intersection as shown in FIG. 38.

Figure 39:
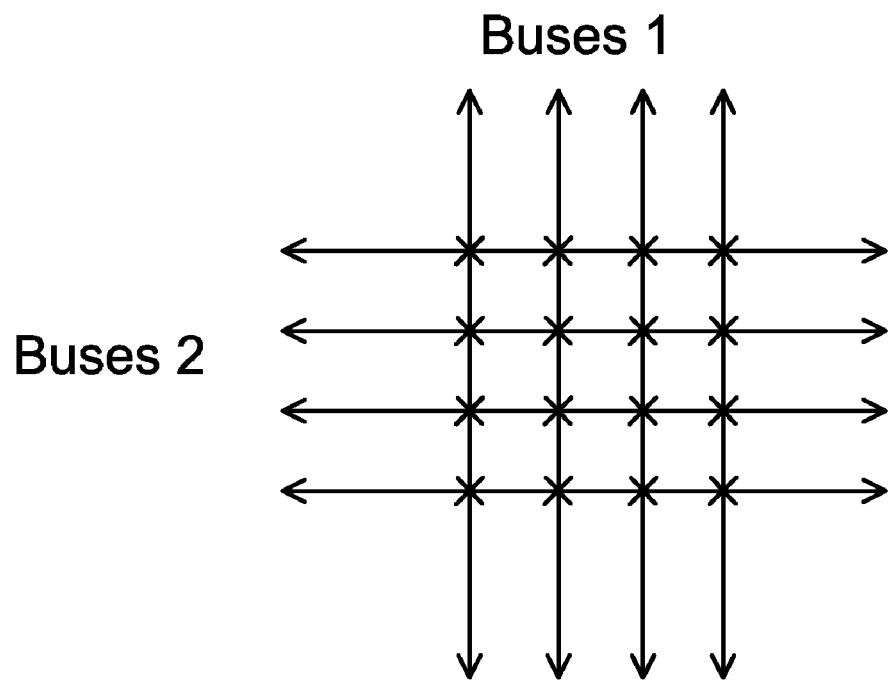
FIG. 39 illustrates an exemplary configuration bus fabric with multiple buses in crosswise directions.
Figure 40:
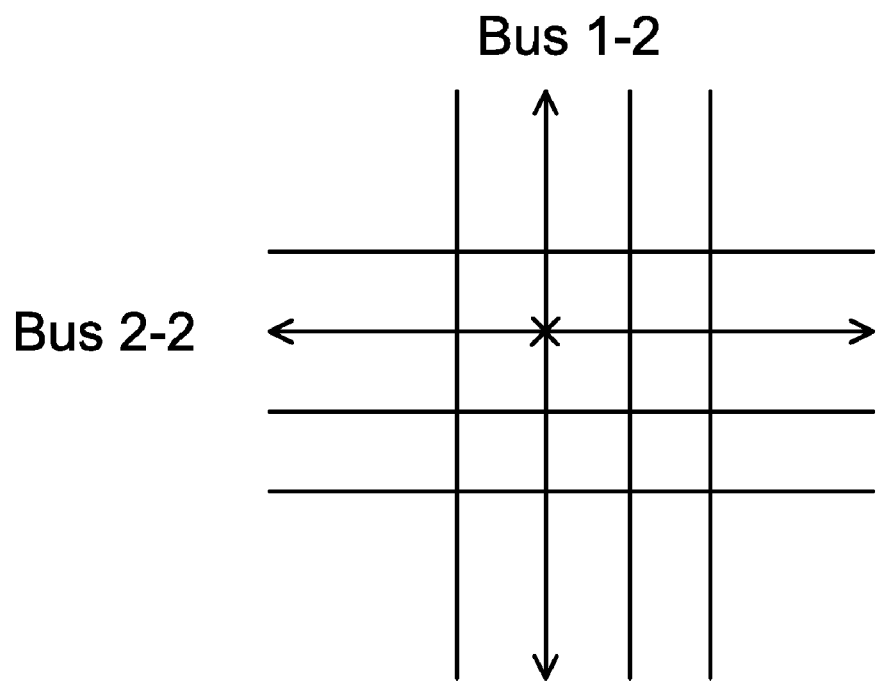
FIG. 40 illustrates an exemplary configuration bus fabric connecting two buses.
Figure 41:
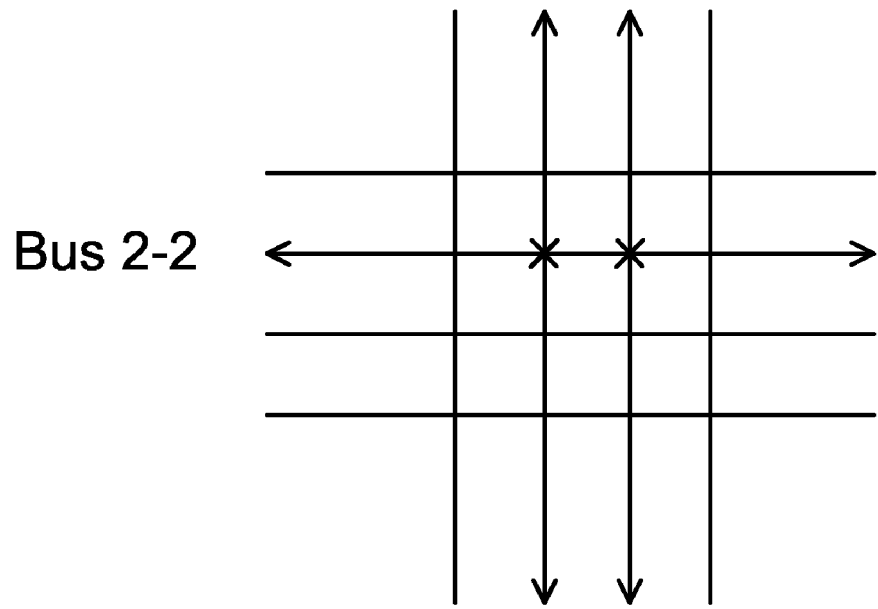
FIG. 41 illustrates an exemplary configuration bus fabric connecting a plurality of buses.
Figure 42:
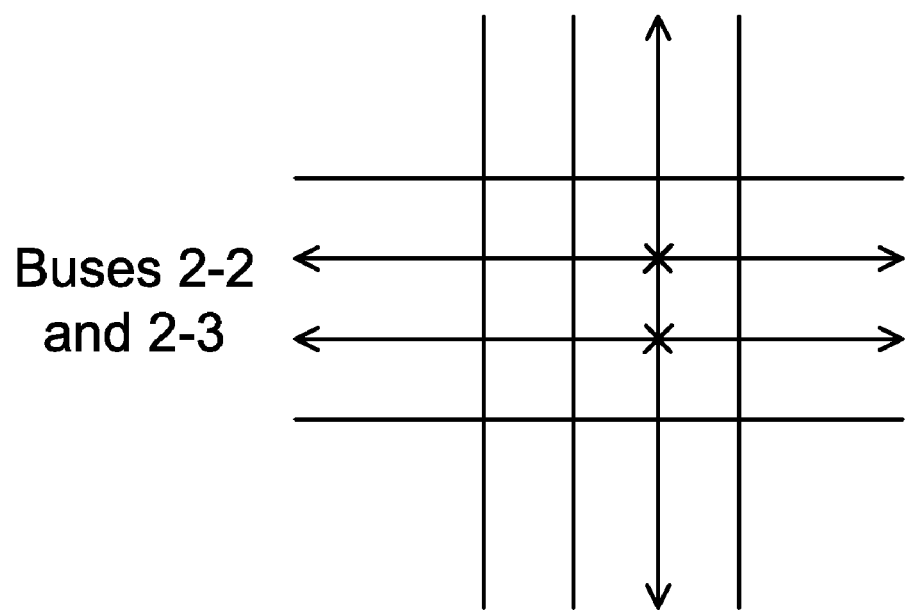
FIG. 42 illustrates another exemplary configuration bus fabric connecting a plurality of buses.

In an embodiment, the configurable bus fabric comprises a plurality of data buses 1 intersecting a plurality of data buses 2 as shown in FIG. 39. FIG. 40 illustrates a connecting intersection between bus 1-2 and bus 2-2, and therefore connecting bus 1-2 with bus 2-2, while other buses are not connected. FIG. 41 illustrates two connections along bus 2-2, which allow the connection of bus 2-2 with bus 1-2 and bus 1-3. Similarly, FIG. 42 illustrates two connections along bus 1-3, which allow the connection of bus 1-3 with bus 2-2 and bus 2-3.

Figure 43:
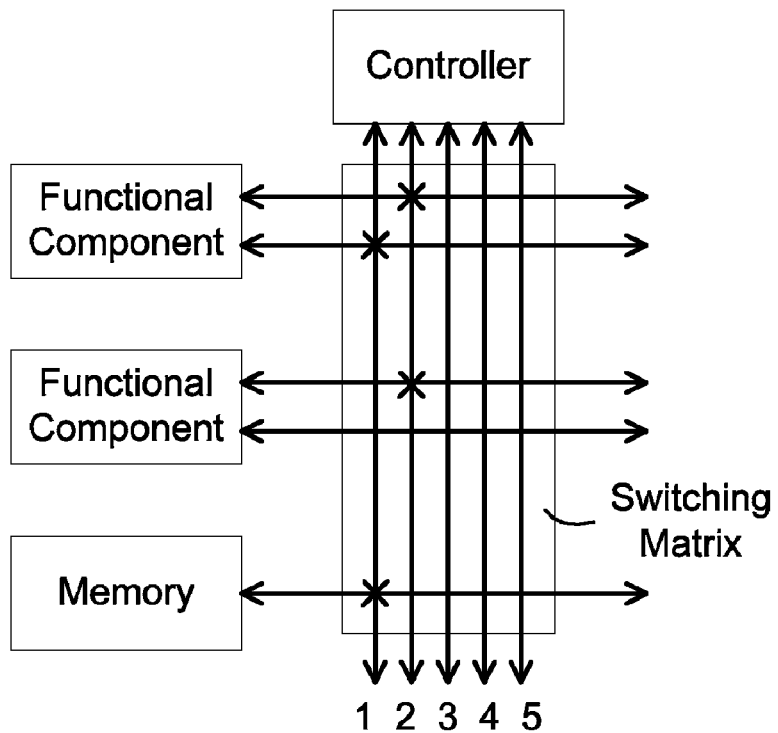
FIG. 43 illustrates an exemplary bus fabric with connection data buses for connecting functional components and memory devices.

In an embodiment, the configurable bus fabric can provide connection between the devices, such as the functional components and memory as shown in FIG. 43. There are various data buses coming to the functional components and the memory. These data buses are intersected by another set of connection data buses with multistate intersections. The connection data buses can provide the connection for the functional components and the memory, preferably through a controller. The connection of a plurality of intersections along a connection data bus can connect a functional component with another functional component or with a memory. For example, the illustrated connections for connection data bus 1 can provide the connection between the functional component with the memory. The illustrated connections for connection data bus 2 can provide the connection between the two functional components.

Figure 44:
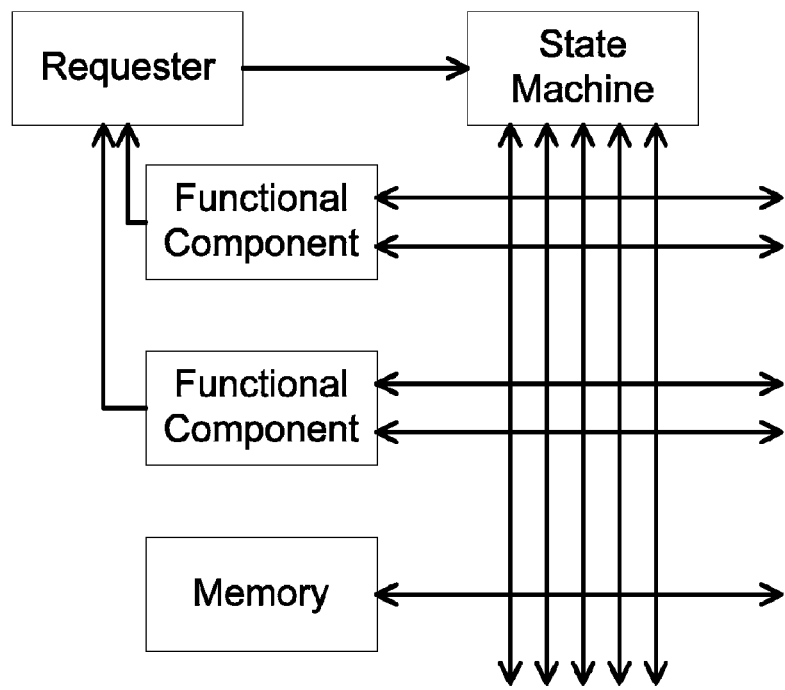
FIG. 44 illustrates another exemplary bus fabric.

FIG. 44 illustrates an exemplary embodiment of bus fabric where the functional components can send a request to a requester circuit, for example, to be connected to another functional component or to a memory device. The requester circuit then can send the request to the controller, which can then set the state of the multistate intersections to provide the requested connections. The controller can first determine a free bus, and then select the free bus to carry out the connections.

Figure 45:
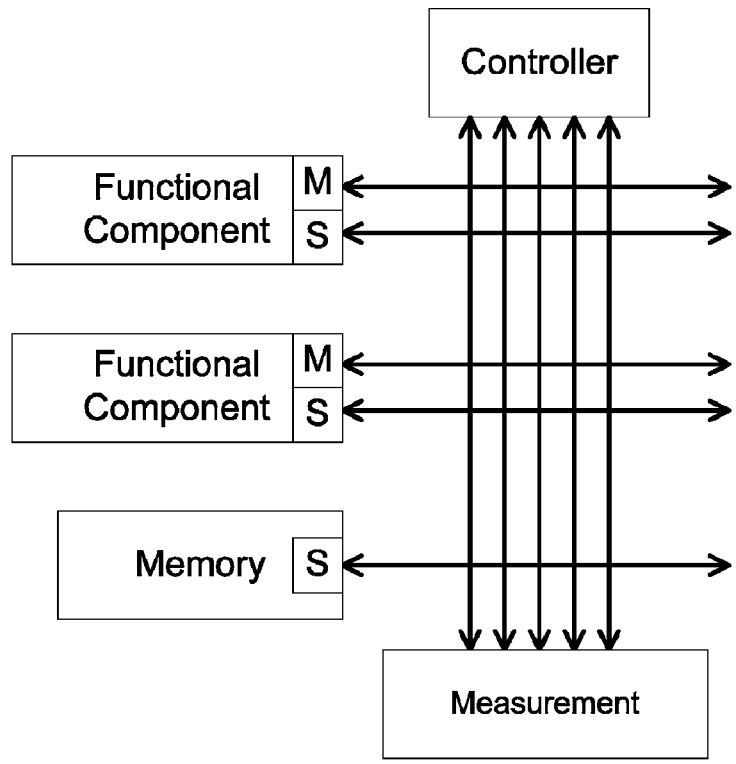
FIG. 45 illustrates another exemplary bus fabric with measurement component for measuring the performance of the connection buses.

FIG. 45 illustrates an exemplary embodiment of bus fabric, including a measurement component for measuring the performance of the connection data buses. The connection data buses are normally used for providing the connection thus the number of data buses is preferably just the right number for the needed connections. The measurement component can provide the utilization of the connection data buses, and which can be analyzed to determine the optimum number of connection data buses. In addition, the data buses coming to the functional components might include a master M bus and a Slave S bus, for actively or passively transmitting or receiving data. For memory device, a Slave S bus is included.

Figure 46:
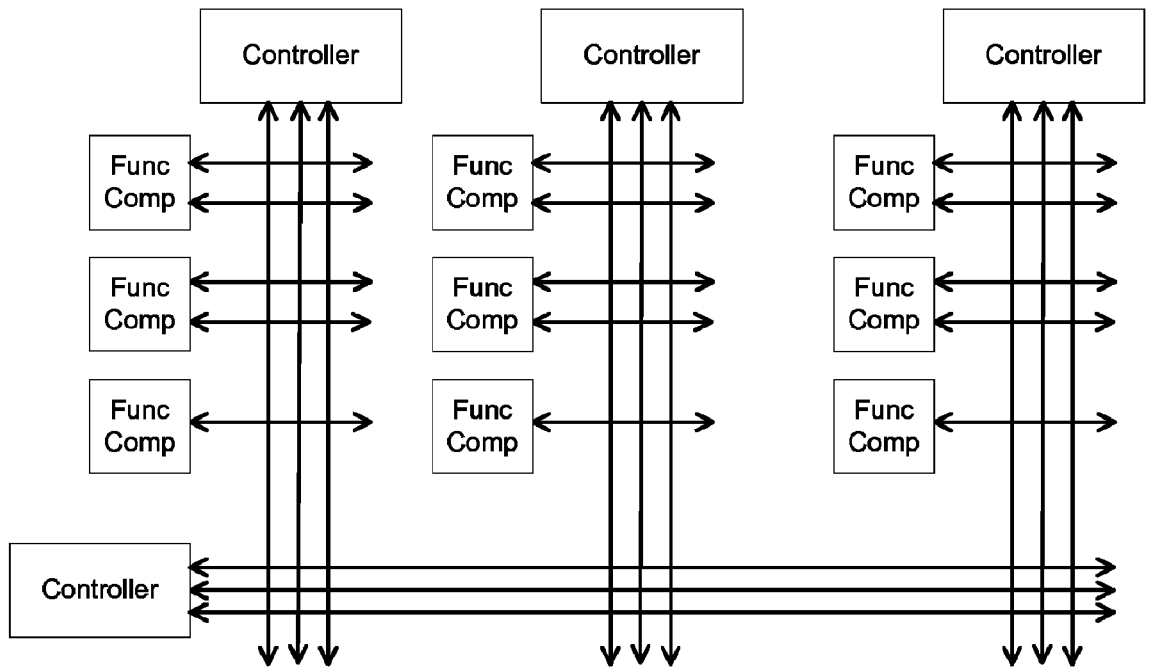
FIG. 46 illustrates an exemplary bus fabric with local and global connection buses.

FIG. 46 illustrates a plurality of connecting buses and a plurality of controller for controlling the connecting buses. The functional components and memories can be arranged in slice, connecting through the local connection buses. The functional components and memories in different slices can be connected through a different set of connection buses (global connection bus) and controller. A functional component in a first slice can be connected to a memory in a third slice through a first local connection bus, going to a global connection bus, and then going to a third local connection bus.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

What is claimed is:

1. A reconfigurable bus fabric for integrated circuit, comprising:
   a first plurality of data buses;
   a second plurality of data buses having multistate intersections with the first plurality of data buses, wherein the multistate intersection comprises a connecting state connecting two data buses and a disconnecting state disconnecting the data buses, wherein the number of the second plurality of data buses is half or less than half the number of the first plurality of data buses; and
   a controller to control the states of the multistate intersections in pairs along a second data bus for connecting two first data buses through a second data bus.

2. A bus fabric as in claim 1 wherein the first and second data buses comprise crosswire data buses.

3. A bus fabric as in claim 1 wherein the multistate intersection comprises at least one of logic devices, switching devices, and MEMS devices.

4. A bus fabric as in claim 1 wherein setting one pair of connecting intersection along a second data bus enables a first data bus to connect to another first data bus through a second data bus.

5. A bus fabric as in claim 1 wherein setting more than one pairs of connecting intersections along a second data bus enable a first data bus to connect to more than one other first data buses through the second data bus.

6. A bus fabric as in claim 1 wherein setting two pairs of connecting intersections along a second data bus with one overlapped connectioning intersection enable a first data bus to connect to two other first data buses through the second data bus.

7. A plurality of bus fabrics as in claim 1 comprising a plurality of first plurality of data buses and a plurality of second plurality of data buses, and further comprising
a third plurality of data buses having multistate intersections with the plurality of second plurality of data buses,
wherein a pair of multistate intersection along a third data bus connects or disconnects a first data bus from a first plurality of data buses and another first data bus from another first plurality of data buses, and
wherein a pair of multistate intersections along a second data bus is distributed to a multistate interconnection on a second data bus from a second plurality of data buses and a multistate interconnection on another second data bus from another second plurality of data buses.

8. A plurality of bus fabric as in claim 7 further comprising a second controller to control the states of the multistate intersections between the third plurality of data buses and the plurality of second plurality of data buses.

9. An integrated circuit, comprising:
a plurality of functional components, each functional component comprising a plurality of logic devices for performing a function;
a first plurality of data buses connected to the plurality of functional components;
a second plurality of data buses having multistate intersections with the first plurality of data buses, wherein the multistate intersection comprises a connecting state connecting two data buses and a disconnecting state disconnecting the data buses; and
a controller to control the states of the multistate intersections in pairs along a second data bus for connecting two first data buses through a second data bus.

10. An integrated circuit as in claim 9 wherein the first and second data buses comprise crosswire data buses.

11. An integrated circuit as in claim 9 wherein the multistate intersection comprises at least one of logic devices, switching devices, and MEMS devices.

12. An integrated circuit as in claim 9 wherein the controller is controlled by a processing unit.

13. An integrated circuit as in claim 9 wherein a functional component is controllably connected to one or more other functional components by setting one or more pairs of connected intersections along a second data bus.

14. An integrated circuit as in claim 9 wherein the second data buses are used to connect the functional components.

15. An integrated circuit as in claim 9 further comprising circuitry to enable a functional component to request connection to another functional component.

16. An integrated circuit as in claim 9 wherein the controller selects a second data bus to assert connecting states for a plurality of intersections to connect two or more functional components.

17. An integrated circuit as in claim 9 wherein the controller selects a second data bus to assert connecting states for a plurality of intersections to connect two or more functional components in response to a signal requesting connection.

18. An integrated circuit as in claim 9 wherein the controller keeps track of free second data buses.

19. An integrated circuit as in claim 9 further comprising a measurement circuitry to monitor the usage of the second data buses.

20. An integrated circuit as in claim 9 wherein the controller disconnects connected intersections after a completion of signal communication from the connected functional components.

21. An integrated circuit as in claim 9 wherein there are a plurality of first and second plurality of data buses, and further comprising
a third plurality of data buses having multistate intersections with the plurality of second plurality of data buses
wherein a pair of multistate intersection along a third data bus connects or disconnects a functional component from a first plurality of data buses and another functional component from another first plurality of data buses, and
wherein a pair of multistate intersections along a second data bus is distributed to a multistate interconnection on a second data bus from a second plurality of data buses and a multistate interconnection on another second data bus from another second plurality of data buses.

22. An integrated circuit as in claim 21 further comprising a second controller to control the states of the multistate intersections between the second and the third data buses.

23. An integrated circuit comprising:
a plurality of subsystems comprising:
a plurality of functional components, each functional component comprising a plurality of logic devices for performing a function;
a first plurality of data buses connected to the plurality of functional components; and
a second plurality of data buses having multistate intersections with the first plurality of data buses, wherein the multistate intersection comprises a connecting state connecting two data buses and a disconnecting state disconnecting the data buses; and
a third plurality of data buses having multistate intersections with the plurality of the second plurality of data buses,
wherein a pair of multistate intersection along a pair of second data buses and a pair of multistate intersection along a third data bus connect or disconnect a functional component from a first subsystem and another functional component from a second subsystem.

24. An integrated circuit as in claim 23 further comprising a controller to control the states of the multistate intersections between the second and the third data buses.

25. An integrated circuit as in claim 23 further comprising a controller to control the states of the multistate intersections between the first and the second data buses.

26. An integrated circuit as in claim 23 further comprising a controller to control the states of the multistate intersections between the first, second and third data buses.

* * * * *